United States Patent
Rofougaran et al.

(10) Patent No.: US 11,426,660 B2
(45) Date of Patent: Aug. 30, 2022

(54) GAMING OBJECT WITH ORIENTATION SENSOR FOR INTERACTING WITH A DISPLAY AND METHODS FOR USE THEREWITH

(71) Applicant: Avago Technologies International Sales Pte. Limited, Singapore (SG)

(72) Inventors: Ahmadreza (Reza) Rofougaran, Newport Coast, CA (US); Maryam Rofougaran, Rancho Palos Verdes, CA (US); Nambirajan Seshadri, Irvine, CA (US); Brima B. Ibrahim, Laguna Hills, CA (US); John Walley, Ladera Ranch, CA (US); Jeyhan Karaoguz, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 292 days.

(21) Appl. No.: 16/730,166

(22) Filed: Dec. 30, 2019

(65) Prior Publication Data

US 2020/0129861 A1 Apr. 30, 2020

Related U.S. Application Data

(63) Continuation of application No. 15/346,418, filed on Nov. 8, 2016, now Pat. No. 10,549,195, which is a
(Continued)

(51) Int. Cl.
*A63F 13/573* (2014.01)
*A63F 13/211* (2014.01)
(Continued)

(52) U.S. Cl.
CPC .......... *A63F 13/573* (2014.09); *A63F 13/211* (2014.09); *A63F 13/212* (2014.09); *A63F 13/213* (2014.09); *A63F 13/235* (2014.09); *G01S 7/412* (2013.01); *G01S 13/426* (2013.01); *G01S 13/878* (2013.01); *G06F 3/011* (2013.01); *G06F 3/0346* (2013.01); *A63F 13/57* (2014.09); *A63F 13/825* (2014.09); *A63F 2300/1012* (2013.01); *A63F 2300/1031* (2013.01);
(Continued)

(58) Field of Classification Search
CPC ...... G01S 7/412; G01S 13/426; G01S 13/878; G01S 13/723; G06F 3/011; G06F 3/0346; G06F 3/012; G06F 3/045
See application file for complete search history.

(56) References Cited

U.S. PATENT DOCUMENTS

2005/0009604 A1  1/2005  Huang
2005/0245204 A1  11/2005  Vance
(Continued)

*Primary Examiner* — Robert T Clarke, Jr.
(74) *Attorney, Agent, or Firm* — Foley & Lardner LLP

(57) ABSTRACT

A gaming object includes an orientation sensor that generates orientation data in response to the orientation of the gaming object. An actuator that generates interaction data in response to an action of a user. A transceiver sends an RF signal to a game device that indicates the orientation data and the interaction data. The game device generates display data for display on a display device that contains at least one interactive item, and wherein the at least one interactive item is interactive in response to the orientation data and the interaction data.

12 Claims, 16 Drawing Sheets

Related U.S. Application Data continuation of application No. 12/131,522, filed on Jun. 2, 2008, now Pat. No. 9,547,080.

(60) Provisional application No. 60/936,724, filed on Jun. 22, 2007.

(51) Int. Cl.
| | |
|---|---|
| *A63F 13/213* | (2014.01) |
| *A63F 13/235* | (2014.01) |
| *A63F 13/212* | (2014.01) |
| *G01S 7/41* | (2006.01) |
| *G01S 13/87* | (2006.01) |
| *G06F 3/01* | (2006.01) |
| *G06F 3/0346* | (2013.01) |
| *G01S 13/42* | (2006.01) |
| *G01S 7/42* | (2006.01) |
| *A63F 13/57* | (2014.01) |
| *A63F 13/825* | (2014.01) |
| *G06F 3/045* | (2006.01) |

(52) U.S. Cl.
CPC ...... *A63F 2300/5553* (2013.01); *G06F 3/012* (2013.01); *G06F 3/045* (2013.01)

(56) References Cited

U.S. PATENT DOCUMENTS

| | | | |
|---|---|---|---|
| 2006/0256090 A1* | 11/2006 | Huppi | ............... A63F 13/02 |
| | | | 345/173 |
| 2006/0264258 A1 | 11/2006 | Zalewski et al. | |
| 2007/0072680 A1* | 3/2007 | Ikeda | ............... A63F 13/213 |
| | | | 463/43 |
| 2007/0075966 A1 | 4/2007 | Daniel | |
| 2007/0249422 A1 | 10/2007 | Podoloff | |
| 2008/0070682 A1* | 3/2008 | Woody | ............... A63F 13/80 |
| | | | 463/30 |

\* cited by examiner

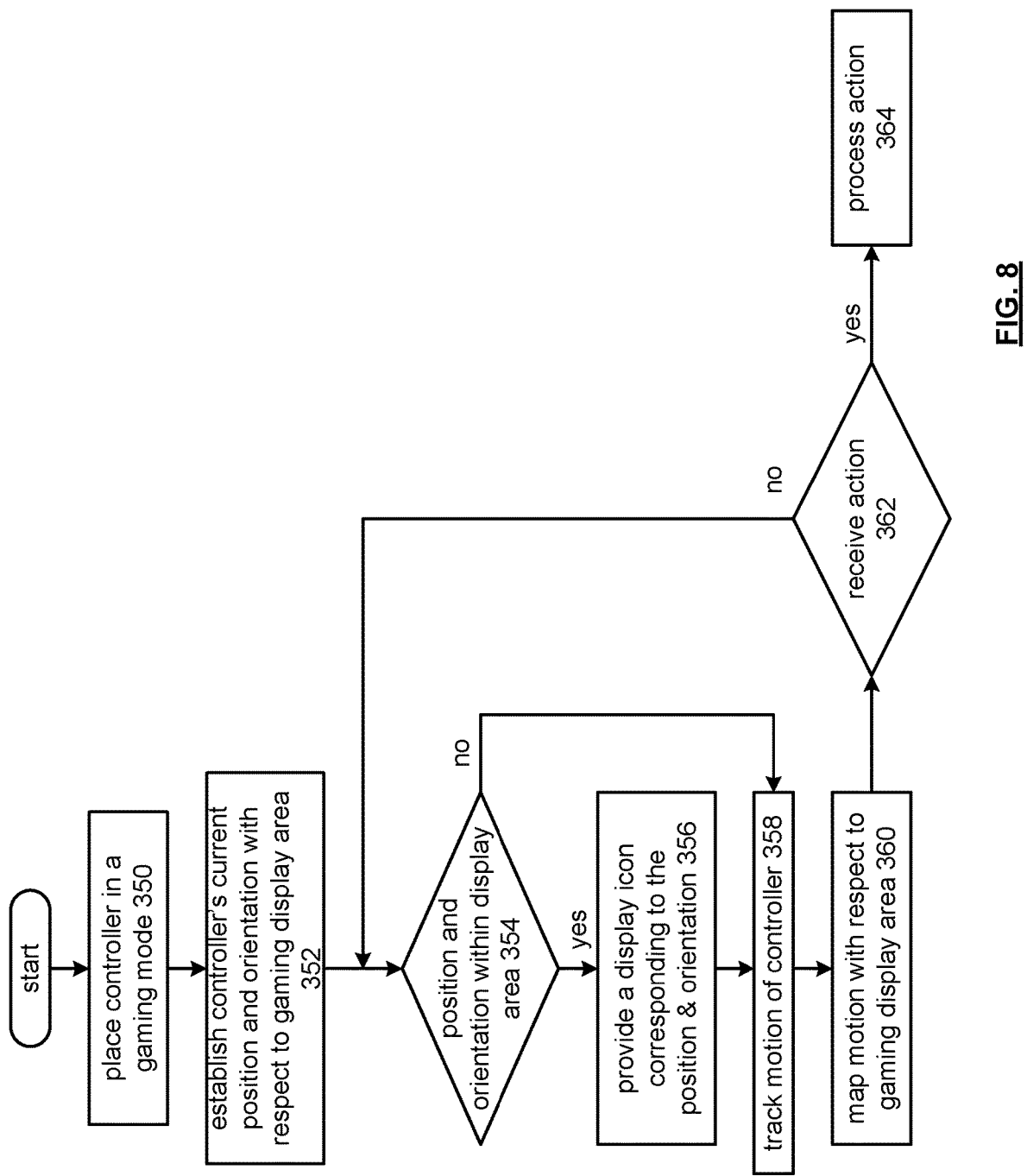

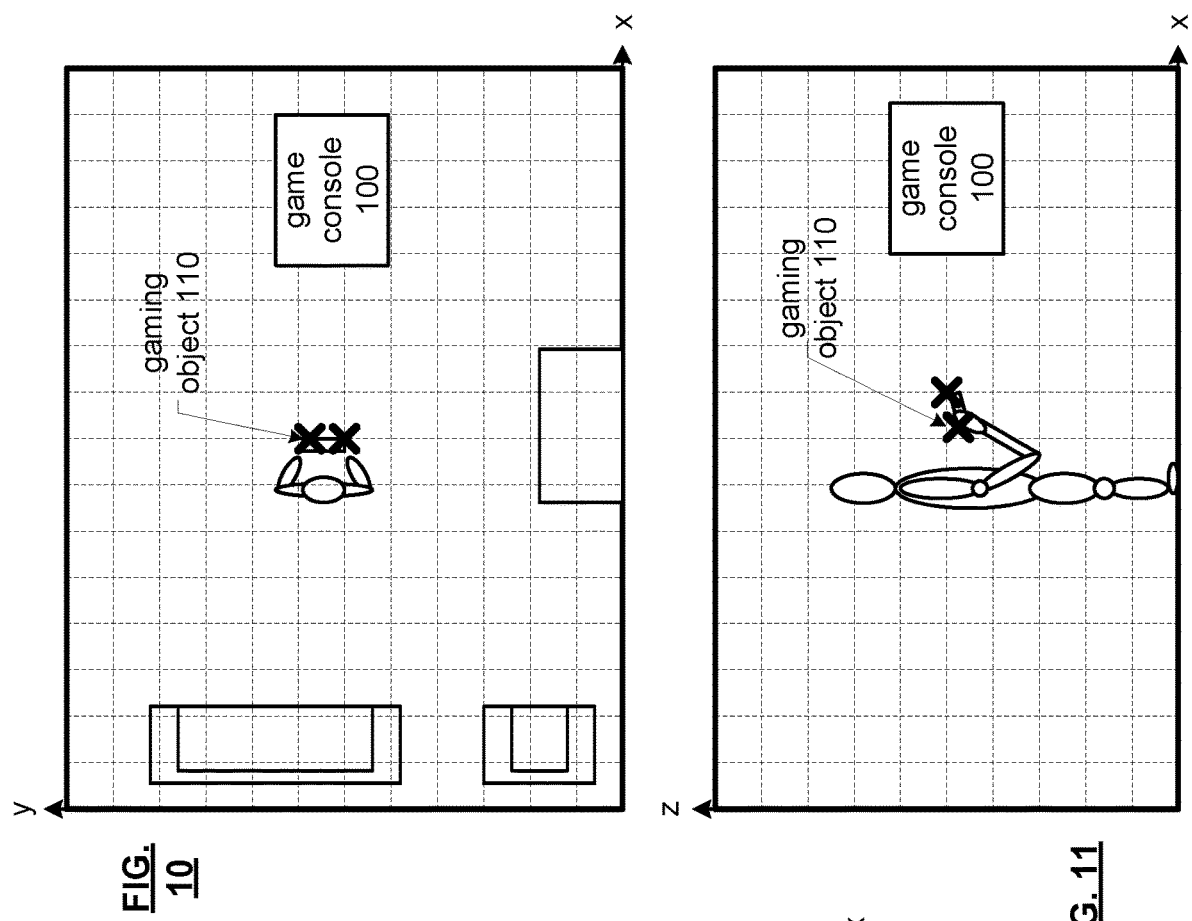
FIG. 10
FIG. 11
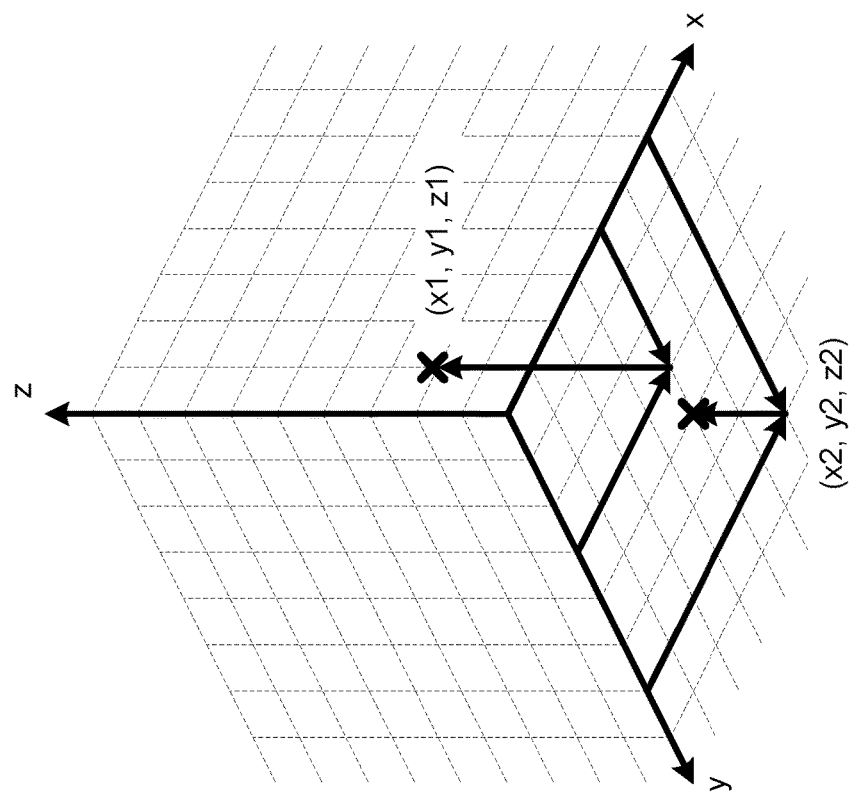
FIG. 9

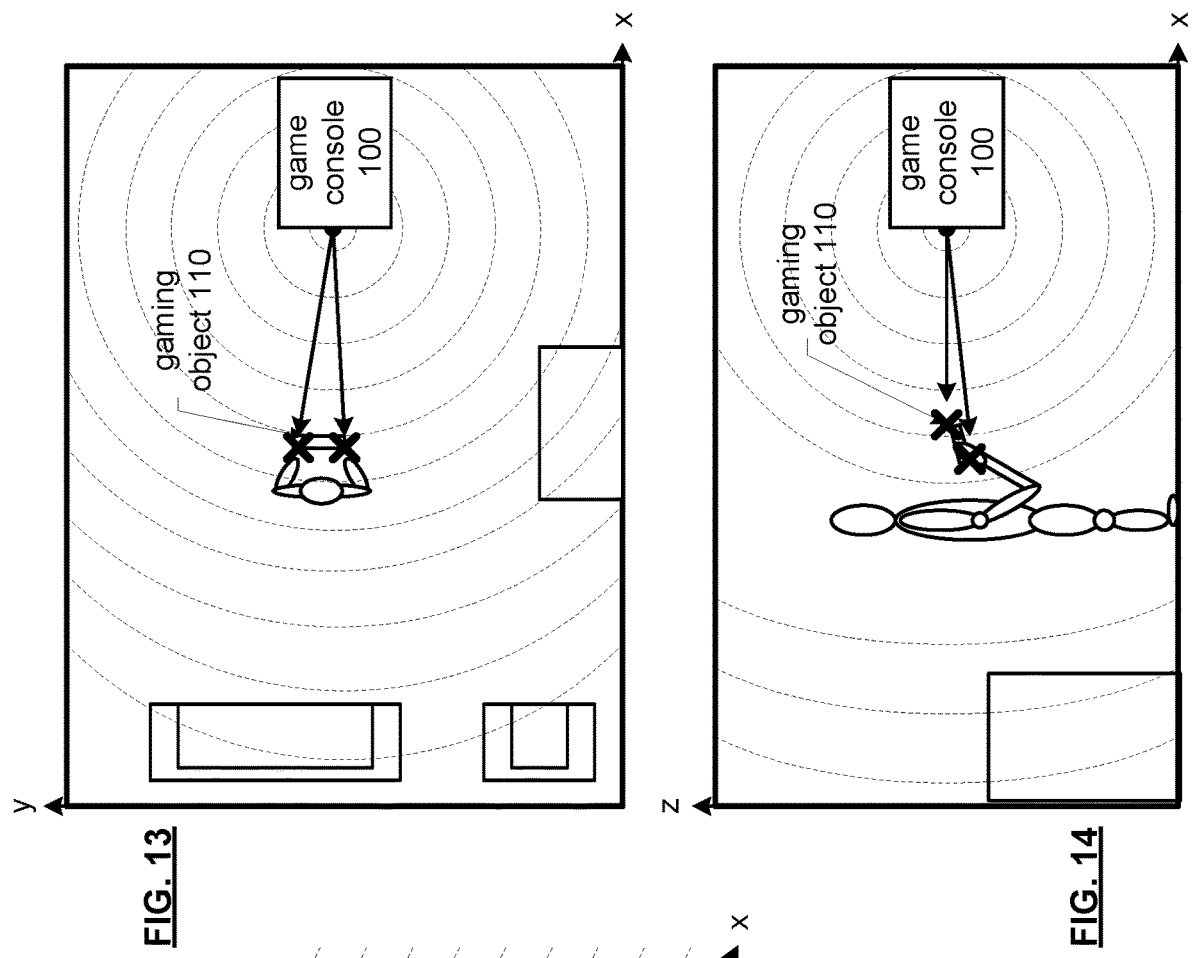
FIG. 13
FIG. 14
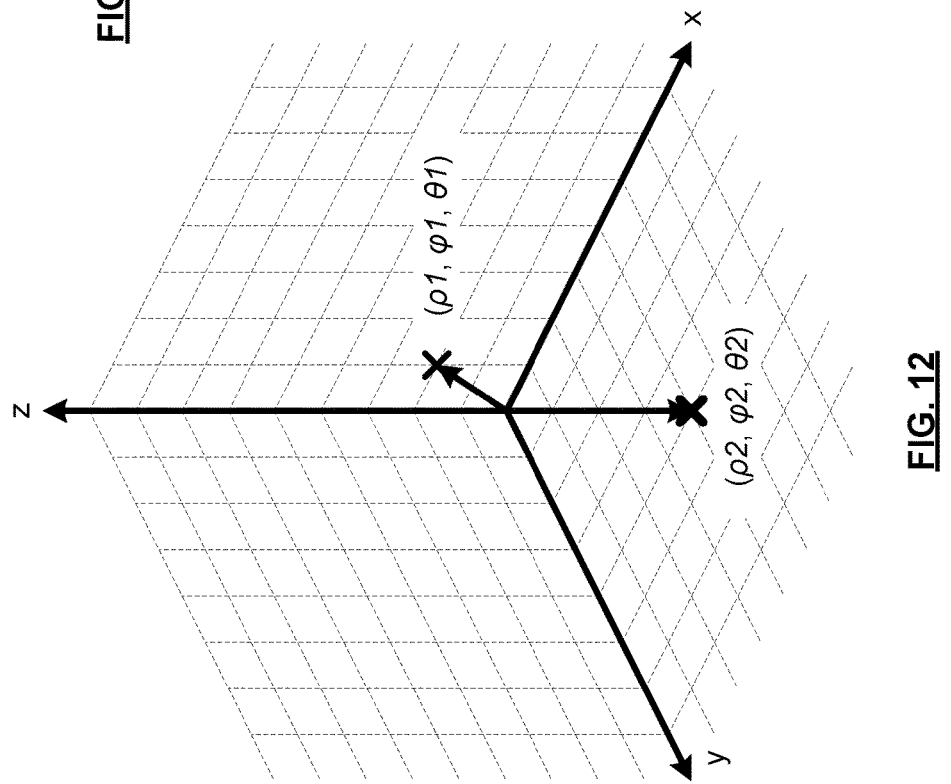
FIG. 12

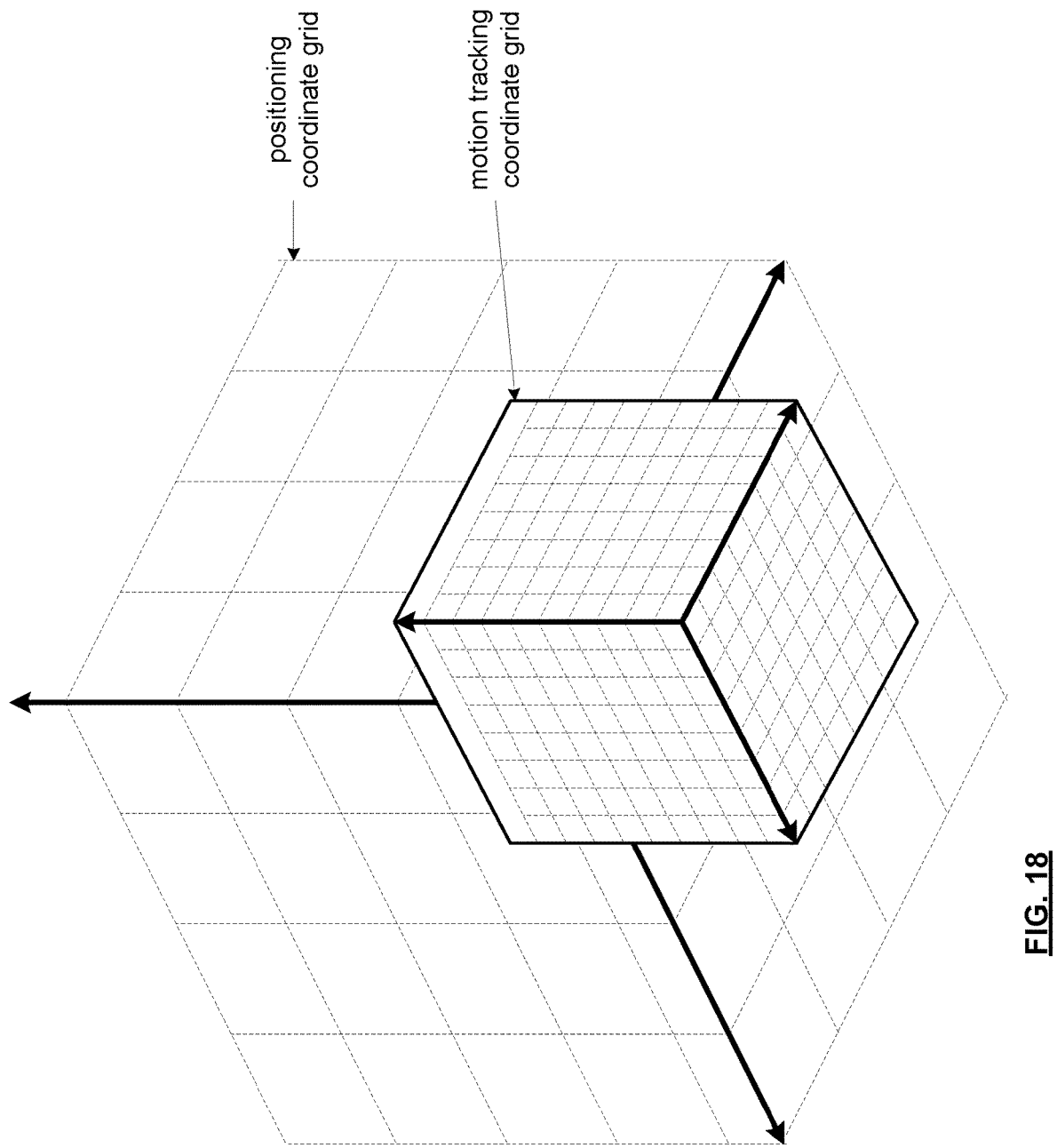

GAMING OBJECT WITH ORIENTATION SENSOR FOR INTERACTING WITH A DISPLAY AND METHODS FOR USE THEREWITH

CROSS REFERENCE TO RELATED PATENTS

The present U.S. Utility Patent Application claims priority pursuant to 35 U.S.C. § 120 as a continuation of U.S. Utility application Ser. No. 15/346,418, entitled "GAMING OBJECT WITH ORIENTATION SENSOR FOR INTERACTING WITH A DISPLAY AND METHODS FOR USE THEREWITH", filed Nov. 8, 2016; which claims priority pursuant to 35 U.S.C. § 120 as a continuation of U.S. Utility application Ser. No. 12/131,522, entitled "GAMING OBJECT WITH ORIENTATION SENSOR FOR INTERACTING WITH A DISPLAY AND METHODS FOR USE THEREWITH", filed Jun. 2, 2008; which claims priority pursuant to 35 U.S.C. § 119(e) to U.S. Provisional Application No. 60/936,724, entitled "VIDEO GAMING SYSTEM WITH POSITION AND MOTION TRACKING", filed Jun. 22, 2007; each of which is hereby incorporated herein by reference in its entirety and made part of the present U.S. Utility Patent Application for all purposes.

TECHNICAL FIELD

This invention relates generally to gaming systems and more particularly to game controllers used for interacting with a game console and an associated display.

BACKGROUND

Home gaming systems typically include a game controller that includes one or more buttons or a joy stick that allows a user to provide input to a game console that runs one or more games. The game console is coupled to a display device such as a television set to provide audio and video output from the game.

In IR communication systems, an IR device includes a transmitter, a light emitting diode, a receiver, and a silicon photo diode. In operation, the transmitter modulates a signal, which drives the LED to emit infrared radiation which is focused by a lens into a narrow beam. The receiver, via the silicon photo diode, receives the narrow beam infrared radiation and converts it into an electric signal.

IR communications are used video games to detect the direction in which a game controller is pointed. As an example, an IR sensor is placed near the game display, where the IR sensor to detect the IR signal transmitted by the game controller. If the game controller is too far away, too close, or angled away from the IR sensor, the IR communication will fail.

Further advances in video gaming include three accelerometers in the game controller to detect motion by way of acceleration. The motion data is transmitted to the game console via a Bluetooth wireless link. The Bluetooth wireless link may also transmit the IR direction data to the game console and/or convey other data between the game controller and the game console.

While the above technologies allow video gaming to include motion sensing, they do so with limitations. As mentioned, the IR communication has a limited area in which a player can be for the IR communication to work properly. Further, the accelerometer only measures acceleration such that true one-to-one detection of motion is not achieved. Thus, the gaming motion is limited to a handful of directions (e.g., horizontal, vertical, and a few diagonal directions).

BRIEF SUMMARY

The present invention is directed to a gaming object including an orientation sensor that generates orientation data in response to the orientation of the gaming object. An actuator generates interaction data in response to an action of a user. A transceiver sends an RF signal to a game device that indicates the orientation data and the interaction data. The game device generates display data for display on a display device that contains at least one interactive item, and the at least one interactive item is interactive in response to the orientation data and the interaction data.

The apparatus and methods of operation are further described in the following Brief Description of the Drawings, the Detailed Description and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 8 is a diagram of a method for processing a position and/or motion based gaming action in accordance with an embodiment of the present invention;

FIGS. 9-11 are diagrams of an embodiment of a coordinate system of a gaming system in accordance with an embodiment of the present invention;

FIGS. 12-14 are diagrams of another embodiment of a coordinate system of a gaming system in accordance with an embodiment of the present invention;

FIG. 18 is a diagram of another embodiment of a coordinate system of a gaming system in accordance with an embodiment of the present invention;

DETAILED DESCRIPTION OF THE INVENTION

Figure 1:
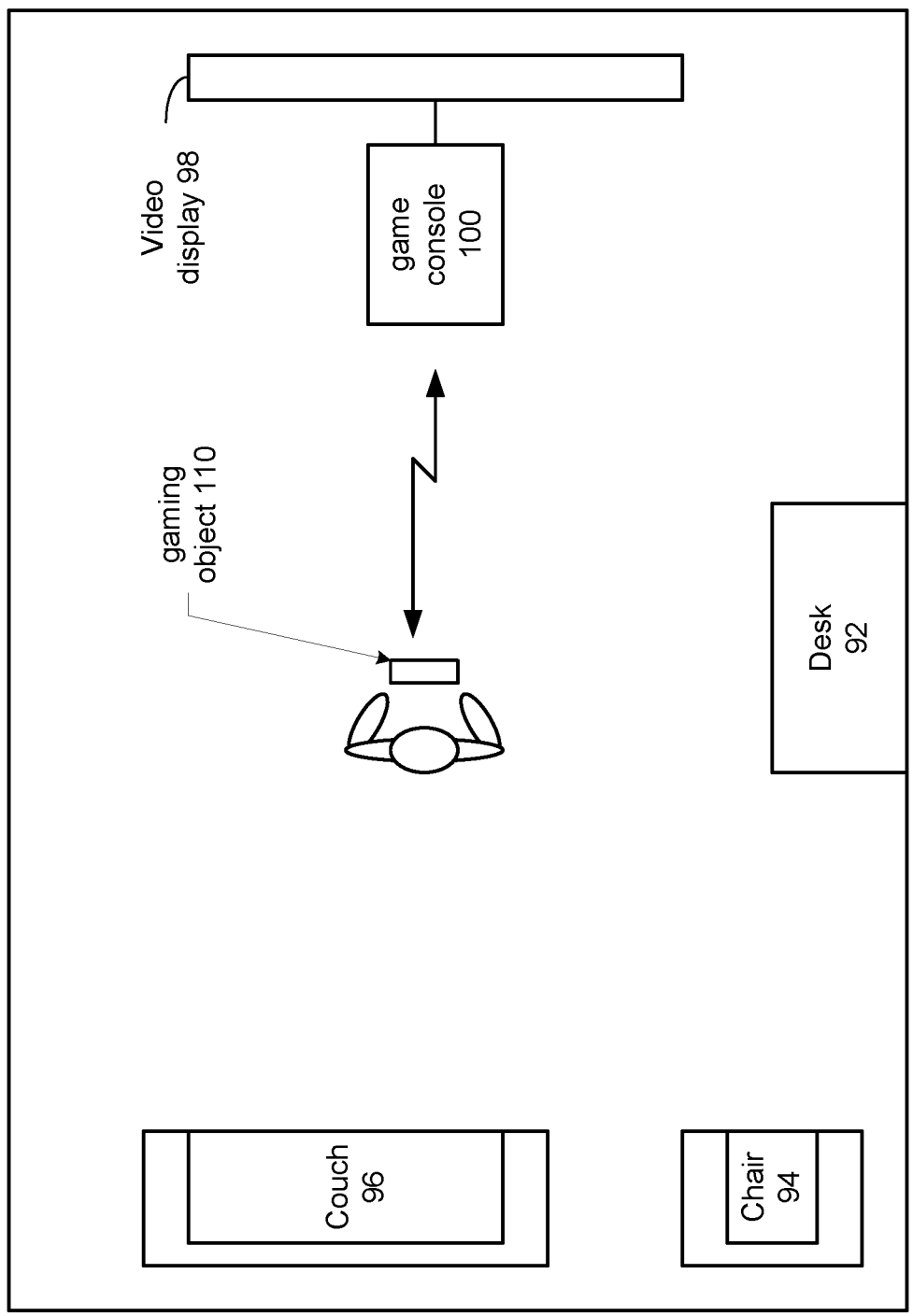
FIG. 1 is a schematic block diagram of an overhead view of an embodiment of a gaming system in accordance with an embodiment of the present invention.

FIG. 1 is a schematic block diagram of an overhead view of an embodiment of a gaming system that includes a game console and a gaming object. A video display 98 is shown that can be coupled to game console 100 to display video generated by game console 100 in conjunction with the set-up and playing of the game and to provide other user interface functions of game console 100. It should also be noted that game console 100 can include its own integrated video display that displays, either directly or via projection, video content in association with any of the functions described in conjunction with video display 98.

The gaming system has an associated physical area in which the game console and the gaming object are located. The physical area may be a room, portion of a room, and/or any other space where the gaming object and game console are proximally co-located (e.g., airport terminal, at a gaming center, on an airplane, etc.). In the example shown the physical area includes desk 92, chair 94 and couch 96.

In an embodiment of the present invention, the gaming object 110 may be a wireless game controller and/or any object used or worn by the player to facilitate play of a video game. For example, the gaming object 110 may include a simulated sword, a simulated gun, a paddle, racquet, bat, or other sporting good, a helmet, a vest, a hat, shoes, socks, pants, shorts, gloves, or other element of a costume or article of clothing, a guitar, baton, keyboard, or other music related item, etc. It should be noted that the gaming object 110 may represent or resemble another object from the game, may be coupled to an object that is worn or otherwise coupled to a user or be as simple as a standard box, pod or other object that is held by the user. Further, the functionally of game object 110 can be included in a multi-function device such as a mobile telephone, personal digital assistant, or other personal electronic device that performs other non-gaming functions.

In this system, the game console 100 determines the orientation of the gaming object 110 within the physical area using one or more orientation sensors. In addition, the game console 100 can further track the motion of the gaming object using one or more motion tracking techniques to facilitate video game play. In this embodiment, the game console may determine an initial orientation and/or position of the gaming object 110 within a tolerance (e.g., within a meter and/or within 1-5 degrees) at an update rate (e.g., once every second or once every few seconds) and tracks the motion or changes in the orientation within a motion tracking tolerance (e.g., within a few millimeters) at a tracking update rate (e.g., once every 10-100 milliseconds) based on motion data and/or orientation data generated in response to the actions of a user.

In addition, the gaming object 110 can be an object that can include a joystick, touch pad, touch screen, wheel, one or more buttons and/or other sensor, actuator or other user interface device that generates other user data in response to the actions of a user. In operation, the gaming object 110 and gaming console 100 communicate via wireless transceivers over a wireless communication link that will be described in greater detail in conjunction with FIG. 4. Game console 100 generates display data for display on a display device such as video display 98. While shown as a home game console 100, gaming object 110 can optionally communicate with other game devices such as an arcade game, a game server that is connected to a local area network, a communication network or public data network such as the Internet, or other game devices. Further while the communication between gaming object 110, is shown as direct communication, gaming object may optionally communicate with a base station or access point that transfers communications to and from the gaming object 110 to the gaming object via a local area network, a communication network or public data network such as the Internet.

In an embodiment of the present invention, the video display 98 displays one or more interactive items in the set-up or execution of at least one game or otherwise in association with a gaming application executed by the game console 100. These interactive items are interactive in response to the orientation data generated based on one or more orientation sensors and other interaction data. For instance, during the initiation of a game, one or more menu items can be displayed on the video display 98 for selection by the user via pointing the gaming object at the menu item and selecting the menu item by the press of a button. In another example, the user can "shoot" at an interactive item on the video display 98, such as a clay pigeon displayed in conjunction with a skeet shooting game, by pointing the gaming object 110 at the clay pigeon and pressing a button or trigger to initiate a shot.

Further details including many optional functions and features are described in conjunction with FIGS. 2-28 that follow.

Figure 2:
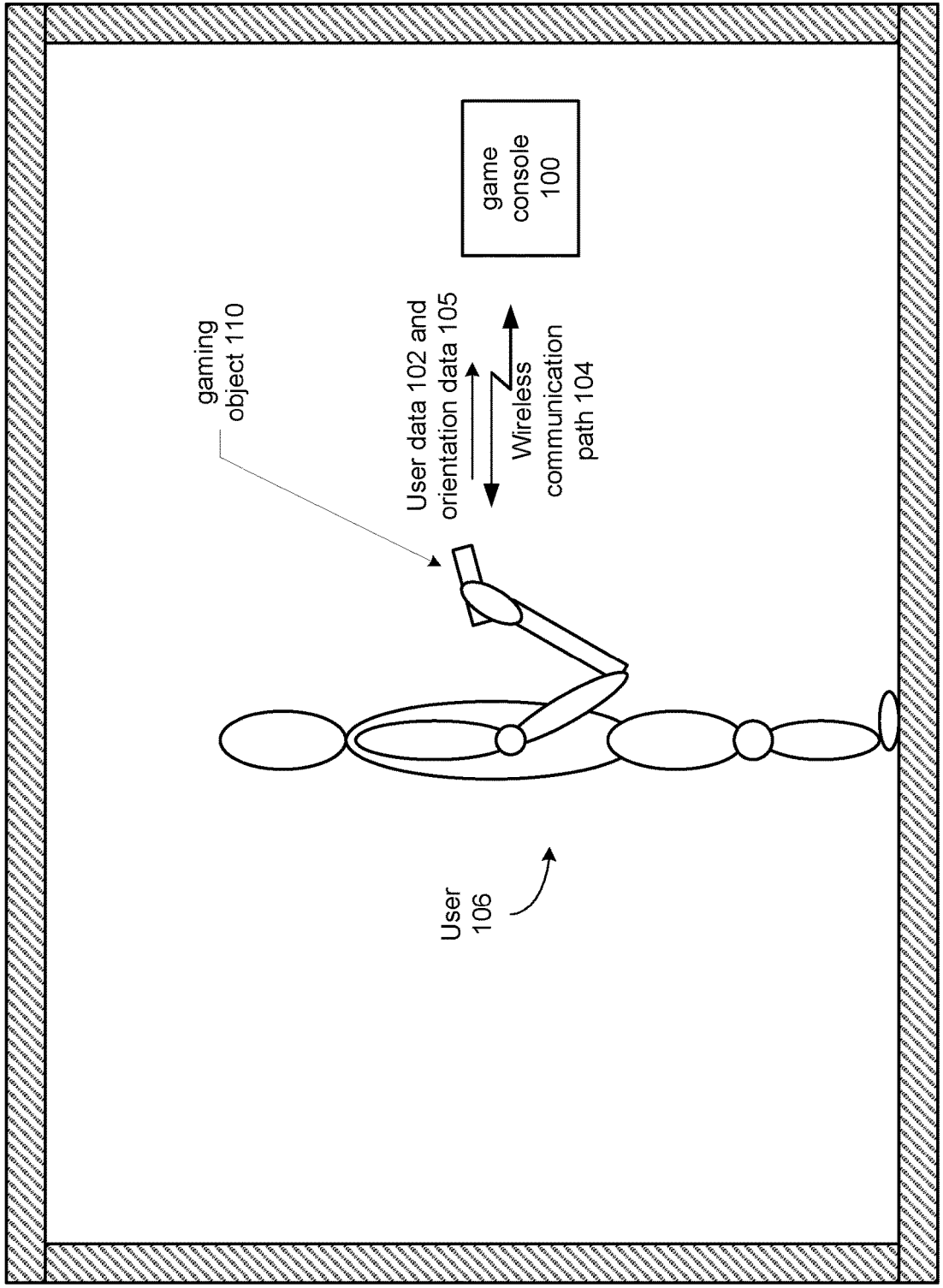
FIG. 2 is a schematic block diagram of a side view of an embodiment of a gaming system in accordance with an embodiment of the present invention.

FIG. 2 is a schematic block diagram of a side view of an embodiment of a gaming system of FIG. 1. In particular, a user 106 is represented schematically as holding a particular gaming object 110 in his or her hand or hands. User data 102 and orientation data is generated by the gaming object 110 and communicated via a wireless communication path 104 with the game console 100. The user data 102 and orientation data 105 can include user selections, commands, position data indicating the position, orientation, and/or motion of the gaming object 110 or other user data that is generated based on the actions of the user in conjunction with the playing, and set-up of a particular game, and/or the user's other interactions with the game console 100.

Figure 3:
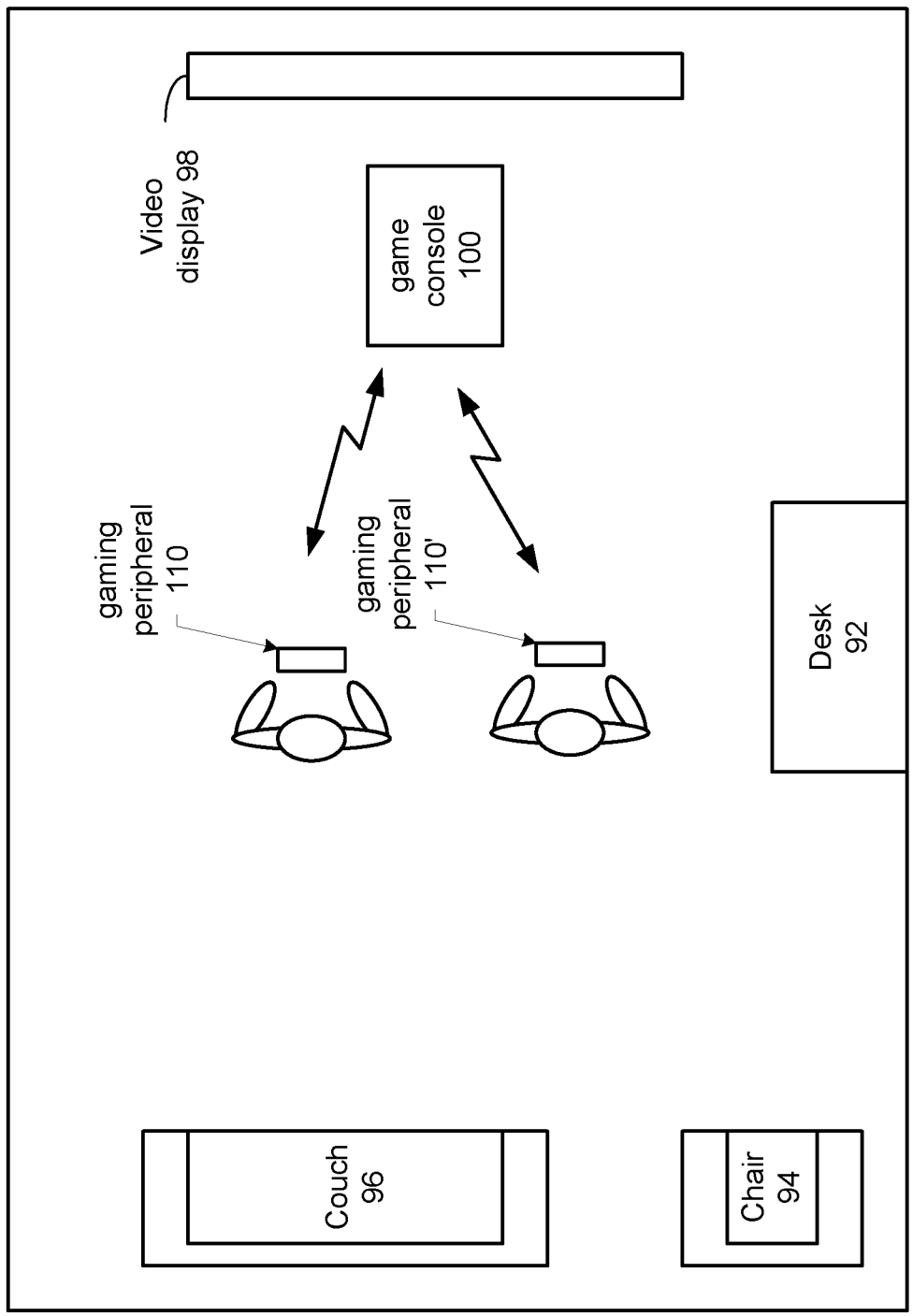
FIG. 3 is a schematic block diagram of an overhead view of another embodiment of a gaming system in accordance with an embodiment of the present invention.

FIG. 3 is a schematic block diagram of an overhead view of another embodiment of a gaming system that includes a game console, a plurality of players and a plurality of gaming objects. In this instance, game console 100 communicates with both gaming object 110 and gaming object 110' and receives corresponding user data and orientation data, such as user data 102 and orientation data 105, from each gaming object. In an embodiment of the present invention, game console 100 operates on a separate frequency for each device, however, time division multiplexing, carrier sense multiple access collision avoidance (CSMA/CA) or other multiple access techniques can likewise be used.

Figure 4:
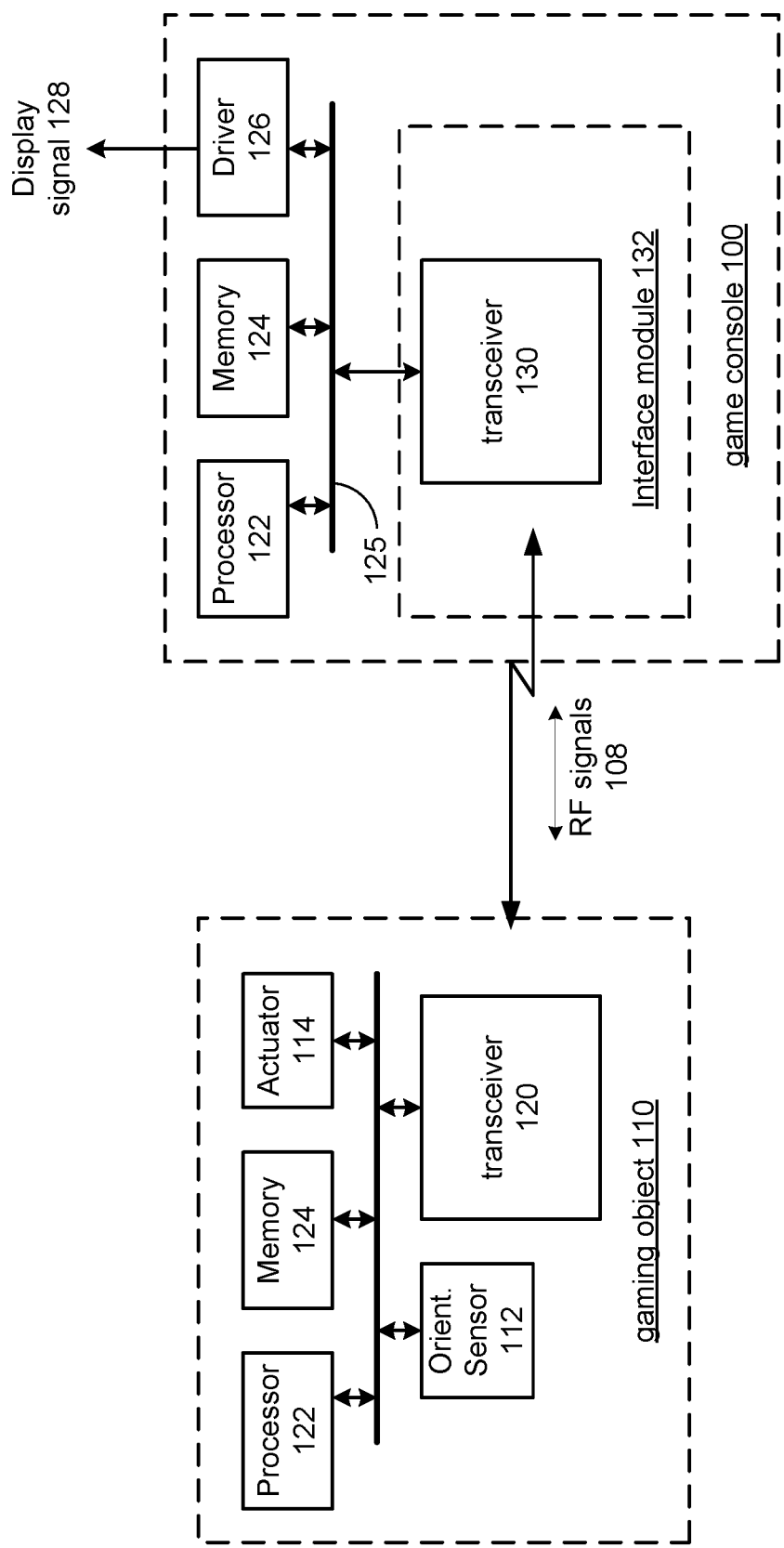
FIG. 4 is a block diagram representation of a gaming system in accordance with an embodiment of the present invention.

FIG. 4 is a block diagram representation of a gaming system in accordance with an embodiment of the present invention. In particular, a gaming system is shown that includes game console 100 and gaming object 110. Gaming object 110 includes an actuator 114 for generating user data, such as user data 102 in response to the actions of a user, such as user 106.

Actuator 114 can include a microphone, button, joy stick, wheel, keypad, keyboard, a resistive strip, touch pad or touch screen, and/or a motion sensor (such as an on-chip gyrator or accelerometer or other position or motion sensing device) along with other driver circuitry for generating user data 102 based on the actions of the user 106. In an embodiment of the present invention, the actuator 114 includes a capacitive sensor, such as a capacitive touchpad or a capacitive touch screen. By touching the capacitive sensor, particularly in response to soft keys or other visual queues displayed by a touch screen or other display, the capacitive sensor can be operable to generate user data 102 that includes an audio output command, such as to change a volume setting, to select, enable or disable background music or other audio effects; an audio input command, that enables or disables voice commands, sets an input level or an input device. In a similar fashion, the capacitive sensor can generate set-up commands, gaming data, preferences data, product registration data, and/or authentication data or other user data 102 in response to the actions of a user, such as user 106.

Orientation sensor 112 can include a photosensor that generates the orientation data 105 based on an optical signal from a video display such as a video display integrated in game console 100 or separate video display 98. In this fashion, the optical signal can be used to generate orientation data 105 that represents the orientation of the gaming object 110. In a further embodiment, orientation sensor 112 includes a plurality of sensors such as motion sensors, RF tags or other that generate orientation data that indicates the orientation of the gaming object 110 based on the relative positions of the plurality of sensors.

Transceiver 120 sends data, such as user data 102 and orientation data 105 to transceiver 130 of game console 100 via RF signals 108. In addition, gaming object 110 optionally receives RF signals 108 from game console 100 that contain other gaming data such as control data, optional display data for display on a touch screen or other display screen incorporated in gaming object 110.

Gaming object 110 optionally contains a processor 122', memory 124' and bus 125'. When included, processor 122' can execute one or more application to perform the operation of a smart gaming controller, to facilitate the generation and transmission of user data 102 and orientation data 105, to perform other gaming operations and to optionally perform non-gaming functions and applications. Transceiver 120 can communicate with transceiver 130 via a wireless telephony protocol operating in a short range or low power mode, via a Bluetooth standard interface, via an 802.11 or other wireless local area network protocol, or via another wireless protocol.

In another embodiment, transceiver 120 is coupled to receive an RF signal 108 initiated by game console 100, such as a 60 GHz RF signal or other RF signal. In a similar fashion to a passive RFID tag, transceiver 120 converts energy from the RF signal 108 into a power signal for powering the transceiver 120 or all or some portion of the gaming object 110. By the gaming object 110 deriving power, in whole or in part, based on RF signal 108, gaming object 110 can optionally be portable, small and light. Transceiver 120 conveys the user data 102 and orientation data 105 back to the game console 100 by backscattering the RF signal 108 based on user data 102 and orientation data 105.

Game console 100 includes an interface module 132 for coupling to the gaming object 110. In particular, interface module 132 includes transceiver 130 that communicates with transceiver 120 either directly or via a network. Game console 100 further includes a memory 124 and processor 122 that are coupled to interface module 132 via a bus 125. In operation, processor 122 executes one or more routines such as an operating system, utilities, and one or more applications such as video game applications or other gaming applications that produce video information that is converted to display signal 128 via driver 126.

Processors 122 and 122' can each include a dedicated or shared processing device. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memories 124 and 124' can each be a single memory device or a plurality of memory devices. Such a memory device may be a read-only memory, random access memory, volatile memory, non-volatile memory, static memory, dynamic memory, flash memory, and/or any device that stores digital information. Note that when the processors 122 or 122' implement one or more of their functions via a state machine, analog circuitry, digital circuitry, and/or logic circuitry, the memory storing the corresponding operational instructions is embedded with the circuitry comprising the state machine, analog circuitry, digital circuitry, and/or logic circuitry. While particular bus architectures are shown, alternative bus architectures including architectures having two or more buses or direct connectivity between the various modules of game console 100 and gaming object 110, can likewise be employed within the broad scope of the present invention.

As discussed in conjunction with FIG. 1 the game console 100 can generate display data for display on a display device that contains at least one interactive item that is interactive in response to the orientation data 105 and interaction data included in user data 102. For instance, an optic sensor in a gaming object 110 that simulates a gun can generate optical feedback to determine if the "gun" is pointed at a particular object, such as a clay pigeon, that is displayed on the screen. If interaction data is generated, such as by the user 106 simulating the pull of a trigger, when the gaming object 110 is pointed at the interactive item, the interaction can result. In the case of the clay pigeon discussed above, the clay pigeon can be shown to be broken by the simulated "shot" from the simulated gun. In a similar fashion, game console can display an interactive menu having menu items that are selectable by pointing the gaming object 110 at the menu item and generating interaction that indicates the user's intent to select the item.

Figure 5:
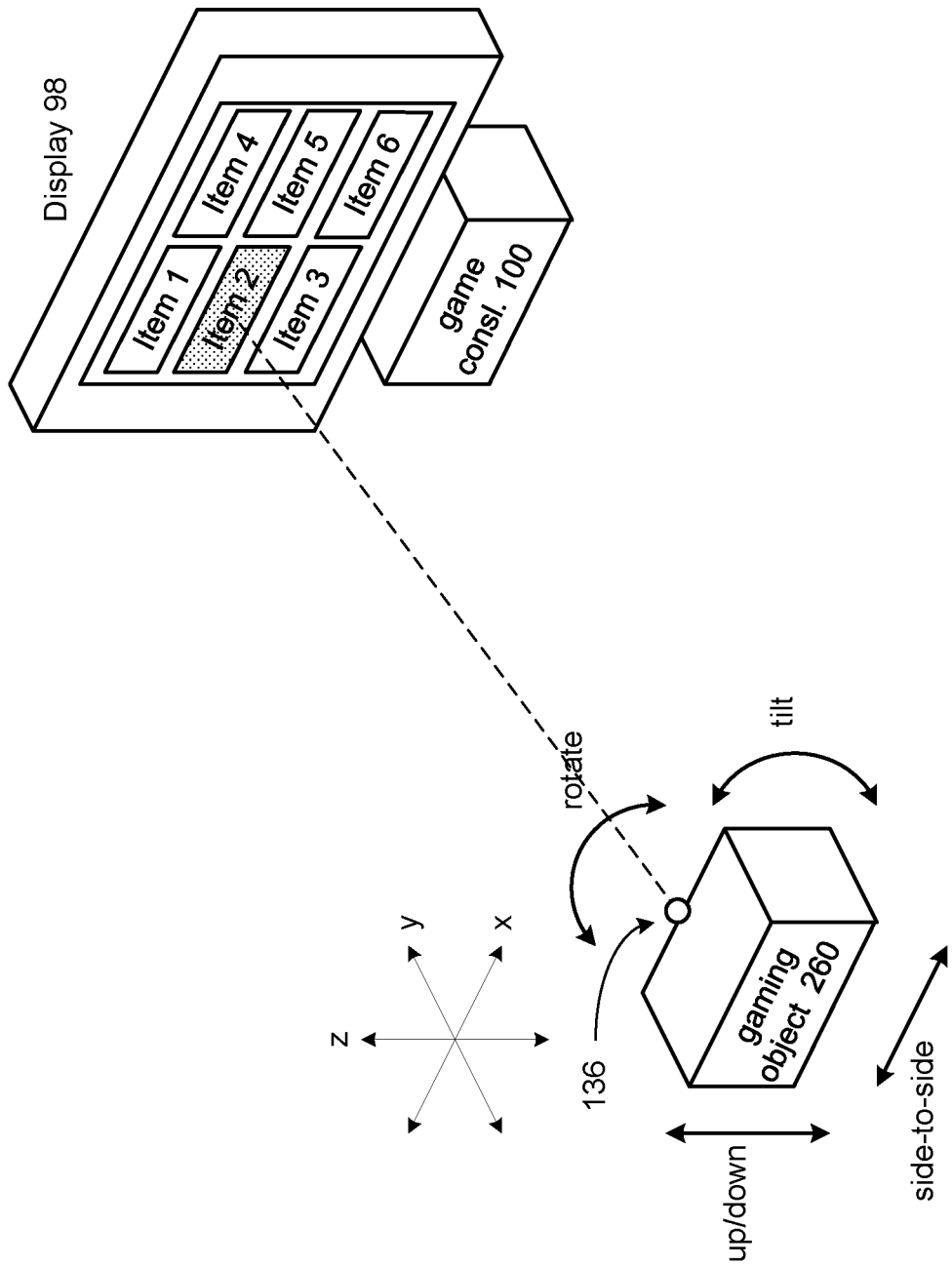
FIG. 5 is a diagram of an example of positioning and/or motioning of a game controller to interact with an item on the display of a game console in accordance with an embodiment of the present invention.

FIG. 5 is a diagram of an example of positioning and/or motioning of a game controller to select an item on the display of a game console. In an embodiment, a game controller 260 such as gaming object 110, and console utilize tracking of the orientation of the controller to provide a selection of a menu item displayed on a video display associated with game console 100. Gaming object 260, such as a geometric solid such as a handheld device that can be positioned and oriented in three dimensional space. In operation, the gaming object 260 can have three dimensional coordinates (x, y, z) and be oriented along roll, pitch and yaw axes based on, for instance, up/down and side-to-side motion, rotation, tilt and translation and rotation about other axes.

In this embodiment, gaming object 110 includes an orientation sensor 112, such as optical sensor 136 that generates orientation data 105 when the orientation of gaming object 260 corresponds to an orientation in alignment with the menu item. In this case, the light emitted by "item 2" in the menu is received by the optical sensor and used to generate orientation data 105. In response, the game console 100 can highlight the menu item when the orientation of the gaming object 260 corresponds to an orientation aligned with the menu item.

In the example shown, the "item 2" is highlighted when the gaming object is pointed at this menu item. This provides visual feedback to a user of gaming object 260 of hat item the gaming object 260 is pointed at. If the user indicates his or her selection of the highlighted item, via an actuator 114 (such as by the click of a button), game console 100 can respond by performing the function associated with this menu item in conjunction with the particular menu displayed.

In an embodiment of the present invention, the orientation data is preprocessed in the optical sensor 136 or processor 122' based on an image generated therefrom to generate orientation data 105. In the alternative, orientation data 105 corresponding to the image or other optical output is sent to game console 100 for processing by processor 122 to determine which the orientation data corresponds to any of the menu items being displayed based on timing of the signal in correspondence to the timing of the displayed image, or based on a recognition of an image or portion of an image corresponding to the displayed item or a portion thereof.

While presented in conjunction with the selection of a menu item, in concert with the clay pigeon/gun example previously presented, the interactive item displayed on display 98 can alternatively be a graphics item displayed in conjunction with a game. In this embodiment, an interaction is generated, such as the breaking of the clay pigeon, when the orientation of the gaming object 260 corresponds to an orientation in alignment with the graphics item on display 98.

Figure 6:
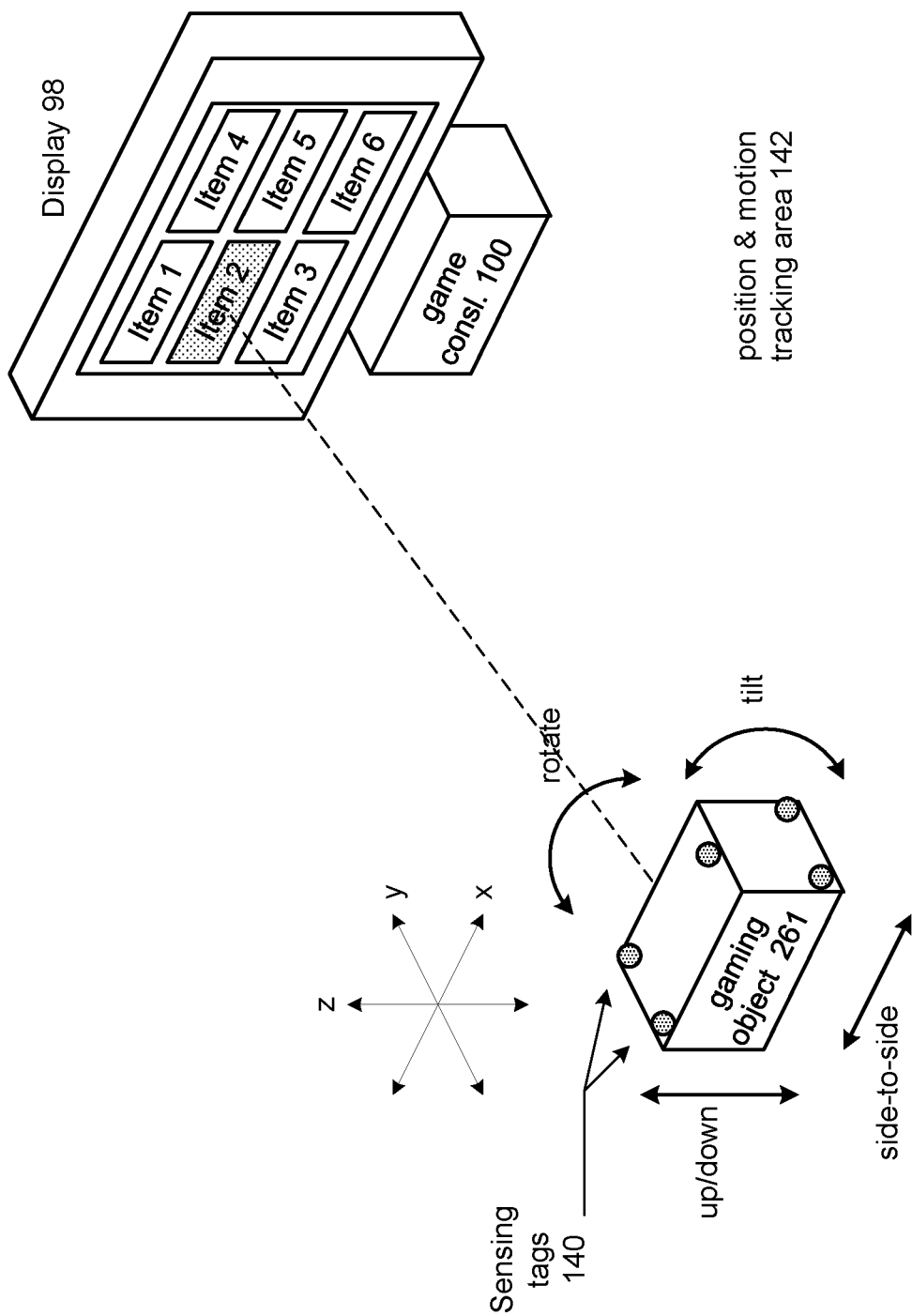
FIG. 6 is a diagram of an example of positioning and/or motioning of a game controller to interact with an item on the display of a game console in accordance with another embodiment of the present invention.

FIG. 6 is a diagram of an example of positioning and/or motioning of a game controller to interact with an item on the display of a game console in accordance with another embodiment of the present invention. In this embodiment, gaming object 261, such as gaming object 110, is implemented with sensing tags 140 for use in generating orientation data 105 that indicates the orientation of the gaming object 261. In particular, the relative position of the sensing tags 140 in three-dimensional space can be used to determine the orientation of the gaming object 261.

In this embodiment, the positioning of the sensing tags can be determined within a positioning tolerance (e.g., within a meter) at a positioning update rate (e.g., once every second or once every few seconds) the motion of the sensing tags 140 can be tracked within a motion tracking tolerance (e.g., within a few millimeters) at a motion tracking update rate (e.g., once every 10-100 milliseconds) within a position and motion tracking area that is range of game console 100.

In an embodiment of the present invention, each of the sensing tags 140 is implemented via an RF tag. In this mode of operation, the game console 100 sends one or more RF signals 108 on a continuous basis and reads the orientation data 105 generated by each of the sensing tags 140 periodically (e.g., once every 10-100 milliseconds) to update the positioning of sensing tags 140. In another mode of operation, the game console 100 generates the sends one or more RF signals 108 periodically (e.g., once every 10-100 milliseconds) and reads the orientation data 105 generated by each of the sensing tags 140 only when required to update the orientation of game object 261. In a further mode of operation, the sensing tags 140 can be RF tags that contain motion sensors or other position sensors and the game object 261 itself reads the position of each of the sensing tags 140 and generates orientation data 105 that is compiled and sent to the game console 100.

Figure 7:
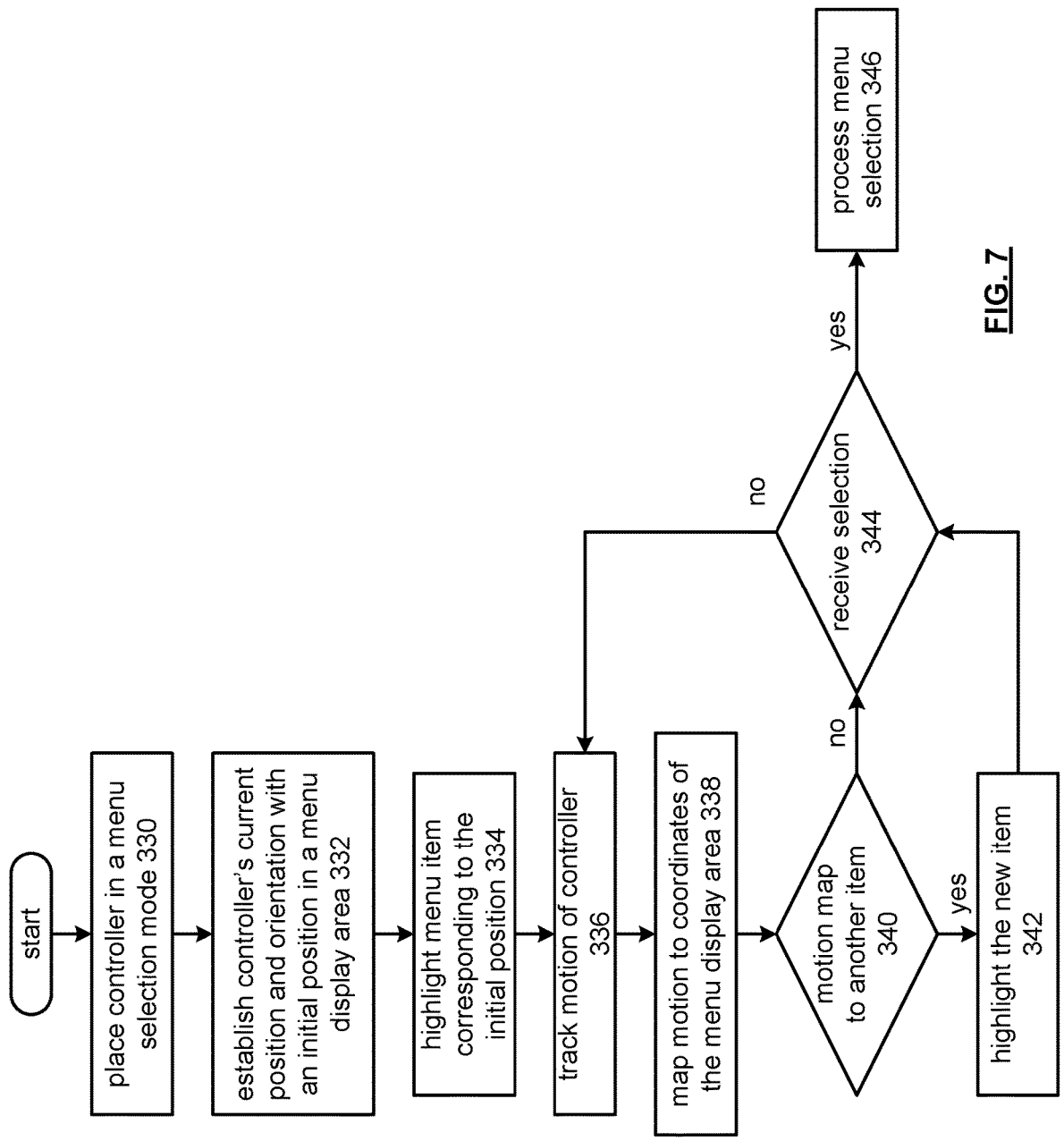
FIG. 7 is a diagram of a method for processing a position and/or motion based selection in accordance with an embodiment of the present invention.

FIG. 7 is a diagram of a method for processing a position and/or motion that begins by placing the controller and/or gaming console in a menu selection mode as shown in step 330. In this mode, the controller is set up to process a menu selection as opposed to a gaming function. The method continues by establishing the gaming object 110's current position and orientation with respect to an initial position in a display area as shown in step 332. For example, regardless of the current position and orientation (assuming it is in range), the gaming object 110's current position and orientation is processed to correspond to a particular location on the menu display.

The method proceeds by highlighting the menu item corresponding to the initial position (e.g., a start menu button) as shown in step 334. The method then continues by tracking the motion of the gaming object and mapping the motion to coordinates of the menu display area (e.g., in an embodiment, the mapping of the motion will be limited to somewhere with the menu display area) as shown in steps 336 and 338. The method continues by determining whether the motion has moved to another item in the menu list as shown in step 340. If yes, the method proceeds by highlighting the new item as shown in step 342.

The method then proceeds by determining whether a selection of the highlighted item is received as shown in step 344. If not, the process continues by tracking the motion in step 336. If a selection is received, the process continues by processing the menu selection as shown in step 346. This may be done in a conventional manner.

FIG. 8 is a diagram of a method for processing a position and/or motion based gaming action that begins by placing the gaming object (e.g., a controller) and/or game console in a gaming mode as shown in step 350. The method continues by establishing the gaming object's current position and orientation with respect to an initial position in a gaming display area as shown in step 352. For example, if the game being played is a shooting arcade game and the gaming object is functioning as a gun, this step determines the initial aiming of the gun.

The method continues by determining whether the position and orientation of the gaming object is within the gaming display area as shown in step 354. If yes, the method continues by providing a display icon corresponding to the position and orientation as shown in step 356. For example, the icon may be cross hairs of a gun to correspond to the aiming of the video game gun. The method continues by tracking the motion of the gaming object and mapping the motion to the gaming display area as shown in steps 358 and 360.

The method continues by determining whether an action has been received as shown in step 362. For example, has the trigger of the gun been pulled? If not, the process repeats as shown. If yes, the process continues by processing the action as shown in step 364. For example, the processing may include mapping the shooting of the gun in accordance with the aiming of the gun.

FIGS. 9-11 are diagrams of an embodiment of a coordinate system of a localized physical area that may be used for a gaming system. In these figures an xyz origin is selected to be somewhere in the localized physical area and each point being tracked and/or used for positioning on the player and/or on the gaming object 110 is determined based on its Cartesian coordinates (e.g., x1, y1, z1). As the player and/or gaming object moves, the new position of the tracking and/or positioning points are determined in Cartesian coordinates with respect to the origin. As discussed in conjunction with FIG. 8, the positions of the sensing tags 140 can be used to determine an orientation of the gaming object 110.

FIGS. 12-14 are diagrams of another embodiment of a coordinate system of a localized physical area that may be used for a gaming system. In these figures an origin is selected to be somewhere in the localized physical area and each point being tracked, such as the position of each sensing tag 140 or other position used for determining the positioning or orientation of the gaming object 110 is determined based on its vector, or spherical, coordinates ($\rho$, $\varphi$, $\theta$), which are defined as: $\rho \geq 0$ is the distance from the origin to a given point P. $0 \leq \varphi \leq 180°$ is the angle between the positive z-axis and the line formed between the origin and P. $0 \leq \theta \leq 360°$ is the angle between the positive x-axis and the line from the origin to the P projected onto the xy-plane. $\varphi$ is referred to as the zenith, colatitude or polar angle, while $\theta$ is referred to as the azimuth. $\varphi$ and $\theta$ lose significance when $\rho = 0$ and $\theta$ loses significance when $\sin(\varphi) = 0$ (at $\varphi = 0$ and $\varphi = 180°$). To plot a point from its spherical coordinates, go p units from the origin along the positive z-axis, rotate $\varphi$ about the y-axis in the direction of the positive x-axis and rotate $\theta$ about the z-axis in the direction of the positive y-axis. As the sensing tags and/or gaming object 110 moves, the new position of the tracking and/or positioning points are determined in vector, or spherical, coordinates with respect to the origin that can be used to determine not only the position of the gaming object 110 but its orientation as well.

While FIGS. 9-14 illustrate two types of coordinate systems, other three-dimensional coordinate systems may be used for tracking motion and/or establishing position and orientation within a gaming system.

Figure 15:
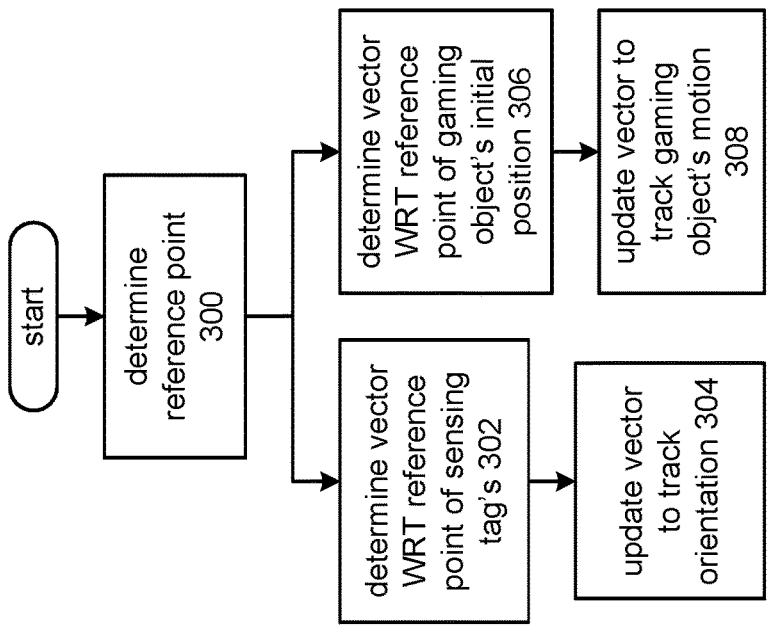
FIG. 15 is a diagram of a method for determining position and/or motion tracking in accordance with an embodiment of the present invention.

FIG. 15 is a diagram of another method for determining position and/or motion tracking that begins in step 300 by determining a reference point within a coordinate system (e.g., the vector coordinate system of FIGS. 9-11). The reference point may be the origin or any other point within the localized physical area. In particular, the reference point can be the location of the game console 100, the location of the game object 110 at a particular time, such as a set-up time, the location of one of a plurality of sensing tags 140, however, other reference points can likewise be used.

The method continues in one or more branches. Along one branch, a vector with respect to the reference point is determined to indicate the initial position of the gaming object 110 and/or the sensing tags 140 based on the reference point as shown in step 302. This branch continues by updating the positions to track the motion and/or orientation of gaming object 110 based on orientation data 105 as shown in step 304.

The other branch includes determining a vector with respect to the reference point for the gaming object 110 to establish its initial position as shown in step 306. This branch continues by updating the gaming object 110's position to track the gaming object's motion using orientation data as shown in step 308. Note that the rate of tracking the motion of the player and/or gaming object may be done at a rate based on the video gaming being played and the expected speed of motion. Further note that a tracking rate of 10 milliseconds provides 0.1 mm accuracy in motion tracking.

Figure 16:
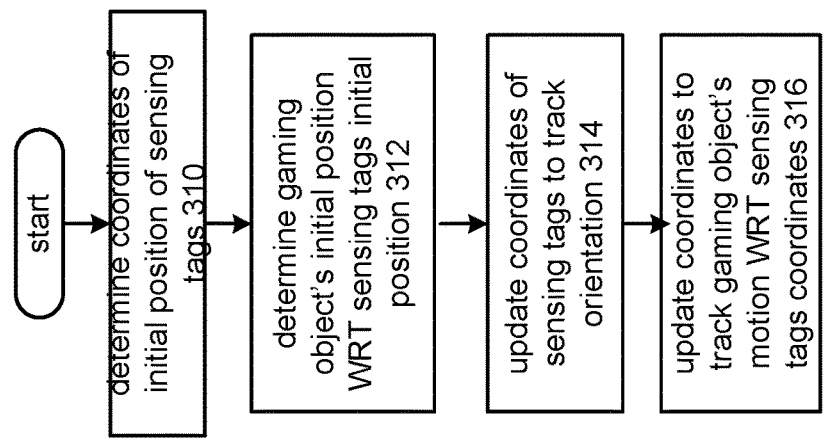
FIG. 16 is a diagram of another method for determining position and/or motion tracking in accordance with an embodiment of the present invention.

FIG. 16 is a diagram of another method for determining position and/or motion tracking that begins in step 310 by determining the coordinates of the sensing tags position in the physical area. The method then continues by determining the coordinates of a gaming object's initial position as shown in step 312. The method then proceeds by updating the coordinates of the sensing tags position in the physical area to track the game objects orientation as shown in step 314. The method also continues by updating the coordinates of a gaming object's position to track its motion as shown in step 316.

Figure 17:
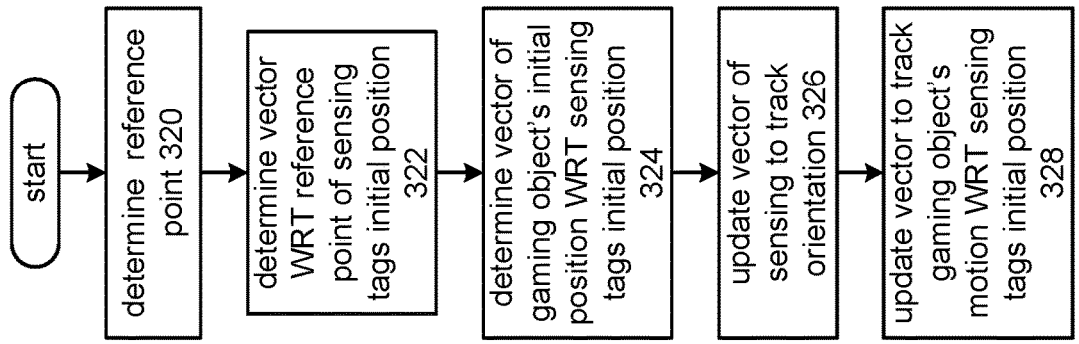
FIG. 17 is a diagram of another method for determining position and/or motion tracking in accordance with an embodiment of the present invention.

FIG. 17 is a diagram of another method for determining position and/or motion tracking that begins in step 320 by determining a reference point within the physical area in which the gaming object lays and/or in which the game system lays. The method then proceeds by determining a vector for the sensing tags initial position with respect to a reference point of a coordinate system (e.g., one of the systems shown in FIGS. 12-14) as shown in step 322. As an example, if the physical area is a room, a point in the room is selected as the origin and the coordinate system is applied to at least some of the room.

The method then continues by determining a vector of a gaming object 110's initial position as shown in step 324. The method then proceeds by updating the vector of the sensing tag's position in the physical area to track the gaming object's orientation as shown in step 326. The method also continues by updating the vector of the gaming object's position to track its motion as shown in step 328.

FIG. 18 is a diagram of another embodiment of a coordinate system of a gaming system that is an extension of the coordinate systems discussed above. In this embodiment, the coordinate system includes a positioning coordinate grid and a motion tracking grid, where the motion tracking grid is of a finer resolution than the positioning coordinate grid. In general, the player or gaming object 110's position within the physical area can have a first tolerance (e.g., within a meter) and the motion tracking of the player and/or the gaming object has a second tolerance (e.g., within a few millimeters). As such, the position of the player and/or gaming object can be updated infrequently in comparison to the updating of the motion (e.g., the position can be updated once every second or so while the motion may be updated once every 10 milliseconds).

Figure 19:
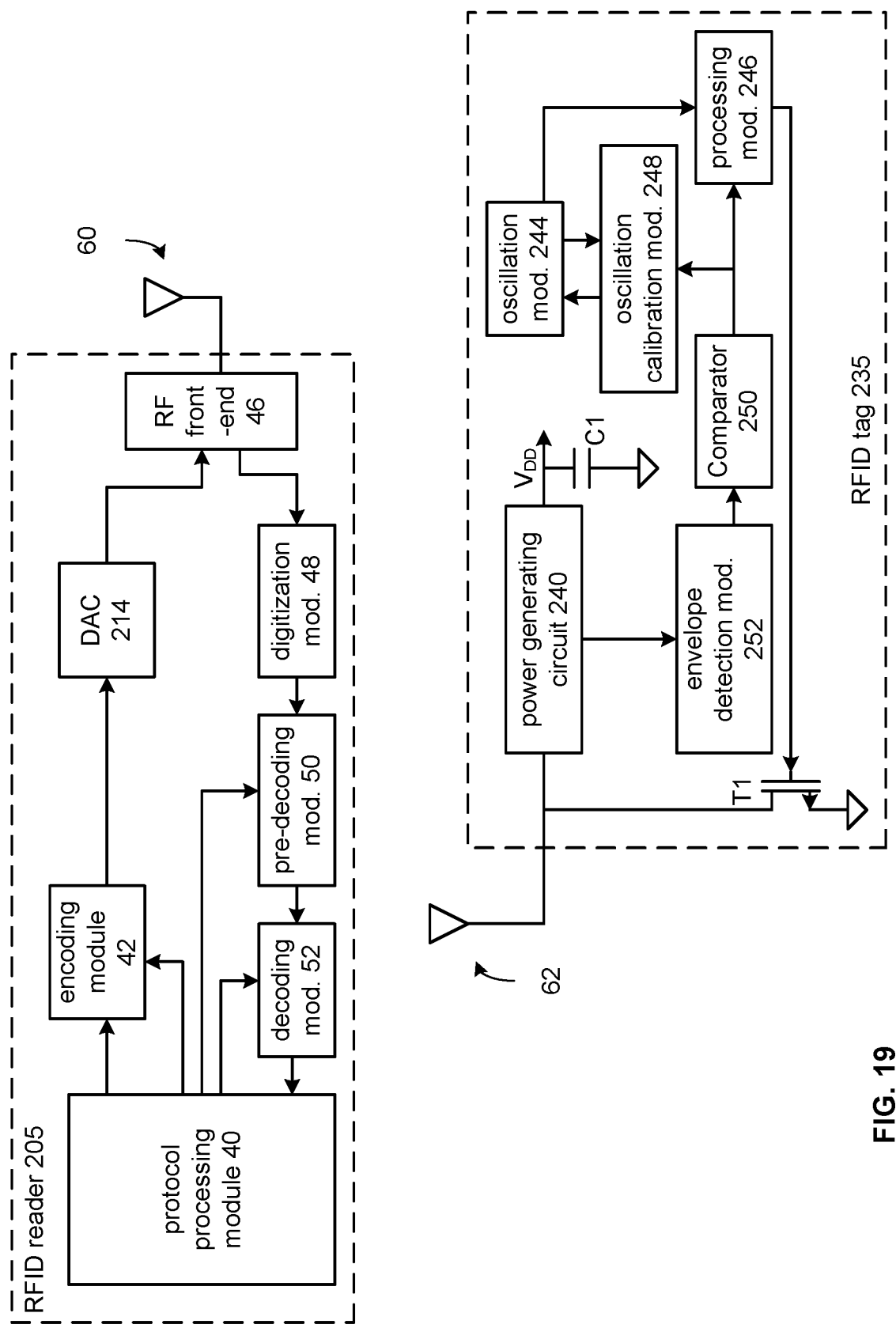
FIG. 19 is a schematic block diagram of an embodiment of an RFID reader and an RFID tag in accordance with an embodiment of the present invention.

FIG. 19 is a schematic block diagram of an embodiment of an RFID reader and an RFID tag. In particular, RFID reader 205 represents a particular implementation of transceiver 130 and RFID tag 235 represents a particular implementation of transceiver 120. In addition, RFID tag can be used in an implementation of sensing tags 140 in communication with RFID reader 235 incorporated in game console 100. As shown, RFID reader 205 includes a protocol processing module 40, an encoding module 42, an RF front-end 46, a digitization module 48, a predecoding module 50 and a decoding module 52, all of which together form components of the RFID reader 205. RFID 205 optionally includes a digital-to-analog converter (DAC) 44.

The protocol processing module 40 is operably coupled to prepare data for encoding in accordance with a particular RFID standardized protocol. In an exemplary embodiment, the protocol processing module 40 is programmed with multiple RFID standardized protocols to enable the RFID reader 205 to communicate with any RFID tag, regardless of the particular protocol associated with the tag. In this embodiment, the protocol processing module 40 operates to program filters and other components of the encoding module 42, decoding module 52, pre-decoding module 50 and RF front end 46 in accordance with the particular RFID standardized protocol of the tag(s) currently communicating with the RFID reader 205. However, if a plurality of RFID tags 235 each operate in accordance with a single protocol, this flexibility can be omitted.

In operation, once the particular RFID standardized protocol has been selected for communication with one or more RFID tags, such as RFID tag 235, the protocol processing module 40 generates and provides digital data to be communicated to the RFID tag 235 to the encoding module 42 for encoding in accordance with the selected RFID standardized protocol. This digital data can include commands to power up the RFID tag 235, to read user data or other commands or data used by the RFID tag in association with its operation. By way of example, but not limitation, the RFID protocols may include one or more line encoding schemes, such as Manchester encoding, FM0 encoding, FM1 encoding, etc. Thereafter, in the embodiment shown, the digitally encoded data is provided to the digital-to-analog converter 44 which converts the digitally encoded data into an analog signal. The RF front-end 46 modulates the analog signal to produce an RF signal at a particular carrier frequency that is transmitted via antenna 60 to one or more RFID tags, such as RF ID rag 235.

The RF front-end 46 further includes transmit blocking capabilities such that the energy of the transmitted RF signal does not substantially interfere with the receiving of a back-scattered or other RF signal received from one or more RFID tags via the antenna 60. Upon receiving an RF signal from one or more RFID tags, the RF front-end 46 converts the received RF signal into a baseband signal. The digitization module 48, which may be a limiting module or an analog-to-digital converter, converts the received baseband signal into a digital signal. The predecoding module 50 converts the digital signal into an encoded signal in accordance with the particular RFID protocol being utilized. The encoded data is provided to the decoding module 52, which recaptures data, such as user data 102 and/or orientation data 105 therefrom in accordance with the particular encoding scheme of the selected RFID protocol. The protocol processing module 40 processes the recovered data to identify the object(s) associated with the RFID tag(s) and/or provides the recovered data to the processor 122 for further processing.

The processing module 40 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 40 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry.

RFID tag 235 that includes a power generating circuit 240, an oscillation module 244, a processing module 246, an oscillation calibration module 248, a comparator 250, an envelope detection module 252, a capacitor C1, and a transistor T1. The oscillation module 244, the processing module 246, the oscillation calibration module 248, the comparator 250, and the envelope detection module 252 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules 244, 246, 248, 250, 252 may have an associated memory element, which may be a single memory device, a plurality of memory devices, and/or embedded circuitry of the module. Such a memory device may be a read-only memory, random access memory, volatile memory, non-volatile memory, static memory, dynamic memory, flash memory, cache memory, and/or any device that stores digital information. Note that when the modules 244, 246, 248, 250, 252 implement one or more of their functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry.

In operation, the power generating circuit 240 generates a supply voltage ($V_{DD}$) from a radio frequency (RF) signal that is received via antenna 254. The power generating circuit 240 stores the supply voltage $V_{DD}$ in capacitor C1 and provides it to modules 244, 246, 248, 250, 252.

When the supply voltage $V_{DD}$ is present, the envelope detection module 252 determines an envelope of the RF signal, which includes a DC component corresponding to the supply voltage $V_{DD}$. In one embodiment, the RF signal is an amplitude modulation signal, where the envelope of the RF signal includes transmitted data. The envelope detection module 252 provides an envelope signal to the comparator 250. The comparator 250 compares the envelope signal with a threshold to produce a stream of recovered data.

The oscillation module 244, which may be a ring oscillator, crystal oscillator, or timing circuit, generates one or more clock signals that have a rate corresponding to the rate of the RF signal in accordance with an oscillation feedback signal. For instance, if the RF signal is a 900 MHz signal, the rate of the clock signals will be n*900 MHz, where "n" is equal to or greater than 1.

The oscillation calibration module 248 produces the oscillation feedback signal from a clock signal of the one or more clock signals and the stream of recovered data. In general, the oscillation calibration module 248 compares the rate of the clock signal with the rate of the stream of recovered data. Based on this comparison, the oscillation calibration module 248 generates the oscillation feedback to indicate to the oscillation module 244 to maintain the current rate, speed up the current rate, or slow down the current rate.

The processing module 246 receives the stream of recovered data and a clock signal of the one or more clock signals. The processing module 246 interprets the stream of recovered data to determine a command or commands contained therein. The command may be to store data, update data, reply with stored data, verify command compliance, read user data, an acknowledgement, etc. If the command(s) requires a response, the processing module 246 provides a signal to the transistor T1 at a rate corresponding to the RF signal. The signal toggles transistor T1 on and off to generate an RF response signal that is transmitted via the antenna. In one embodiment, the RFID tag 235 utilizing a back-scattering RF communication. Note that the resistor R1 functions to decouple the power generating circuit 240 from the received RF signals and the transmitted RF signals.

The RFID tag 235 may further include a current reference (not shown) that provides one or more reference, or bias, currents to the oscillation module 244, the oscillation calibration module 248, the envelope detection module 252, and the comparator 250. The bias current may be adjusted to provide a desired level of biasing for each of the modules 244, 248, 250, and 252.

Figure 20:
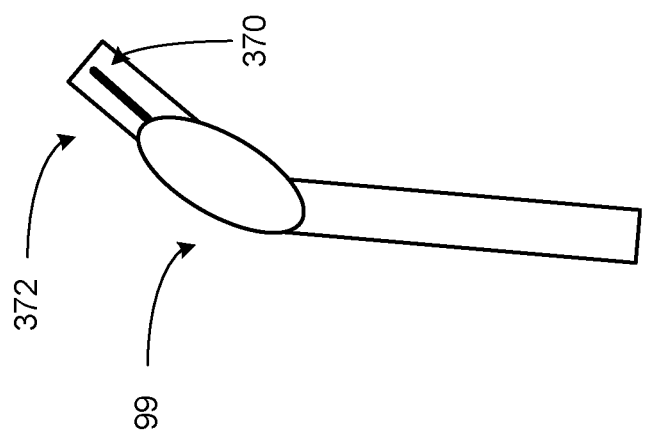
FIG. 20 is a schematic block diagram of a user's hand grasping a gaming object with a capacitive sensor in a first manner is accordance with an embodiment the present invention.

FIG. 20 is a schematic block diagram of a user's hand grasping a gaming object with a capacitive sensor in a first manner is accordance with an embodiment the present invention. In this embodiment gaming object 372, such as gaming object 110, includes a capacitive sensor 370 shown as a capacitive strip. When a user grasps the gaming object 372 in his or her hand 99, the hand 99 comes in contact with the capacitive sensor 370.

In an embodiment of the present invention, the capacitive sensor includes a layer that can store an electrical charge. When a user touches the sensor a portion of the charge is transferred to the user reducing the charge in the capacitive layer. The capacitive sensor 370 includes a driver that differences in charge from end to end of the strip to determine the amount and location of the touch that can be output as user data, such as user data 102. In addition, the capacitive sensor can isolate biofeedback data such as a user's heart rate, a level of perspiration, or other biometric data that can be included in user data 102.

In an embodiment of the present invention, the capacitive sensor 370 generates user data 102 that includes biofeedback data that can be used by game console 100 to adjust a game parameter of the gaming application based on the biofeedback data. For instance in an adventure game, an excitement level of the game can be reduced in response to biofeedback indicating a heart rate or level of perspiration that is too high or increasing too rapidly. In another embodiment, the game can sense the fear of a user via biofeedback that indicates a high heart rate or level of perspiration. In a sports game, biofeedback can indicate a level of fatigue of the user based on heart rate or perspiration levels and take action to taunt the player in a light-heated way or otherwise adjust the level of difficulty of the game based on the user's fatigue.

In a further embodiment of the present invention, the user data 102 generated by the capacitive sensor can indicate the manner in which the user grasps the gaming object, in terms of the level of tightness, the position of the hand on the gaming object 372, etc. each of these parameters can be included in user data 102 and the game console 100 can adjust one or more game parameters in response.

For instance, in a tennis game, the gaming object 372 may be used to simulate a tennis racquet in a user's hand. The game may attribute more power to the user's serve if the gaming object is held near one end, signifying greater simulated racquet extension during the serve. However, if the position of the gaming object is not shifted to a more normal position near the center of the gaming object for a ground stroke shot, a greater probability of a "miss-hit" shot can attributed based on the user data 102. Similarly, in a baseball game, a bunt by a user may require the user to shift his or her hand position on the gaming controller to simulate "choking-up" on the simulated bat.

It should be noted that these examples are merely illustrative of the many possible applications of the use of user data 102 generated in the context of a game.

Figure 21:
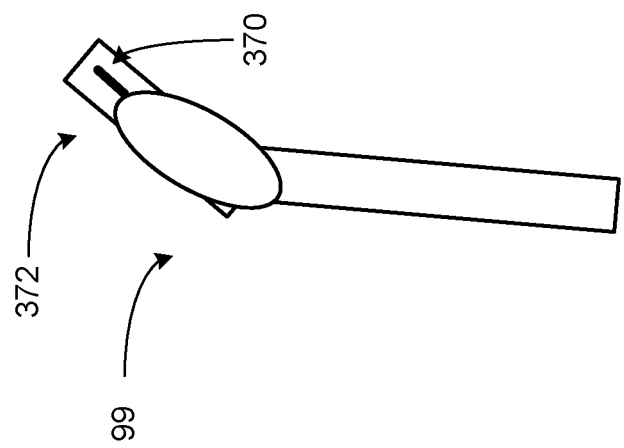
FIG. 21 is a schematic block diagram of a user's hand grasping a gaming object with a capacitive sensor in a second manner is accordance with an embodiment the present invention.

FIG. 21 is a schematic block diagram of a user's hand grasping a gaming object with a capacitive sensor in a second manner is accordance with an embodiment the present invention. As compared with FIG. 20, the user's hand 99 is in a different position on the gaming object 372 covering more of the capacitive sensor 370. As discussed in conjunction with FIG. 20, this change in the manner in which the gaming object 372 is grasped can be indicated via user data 102 and used to adjust one or more parameters of a game.

Figure 22:
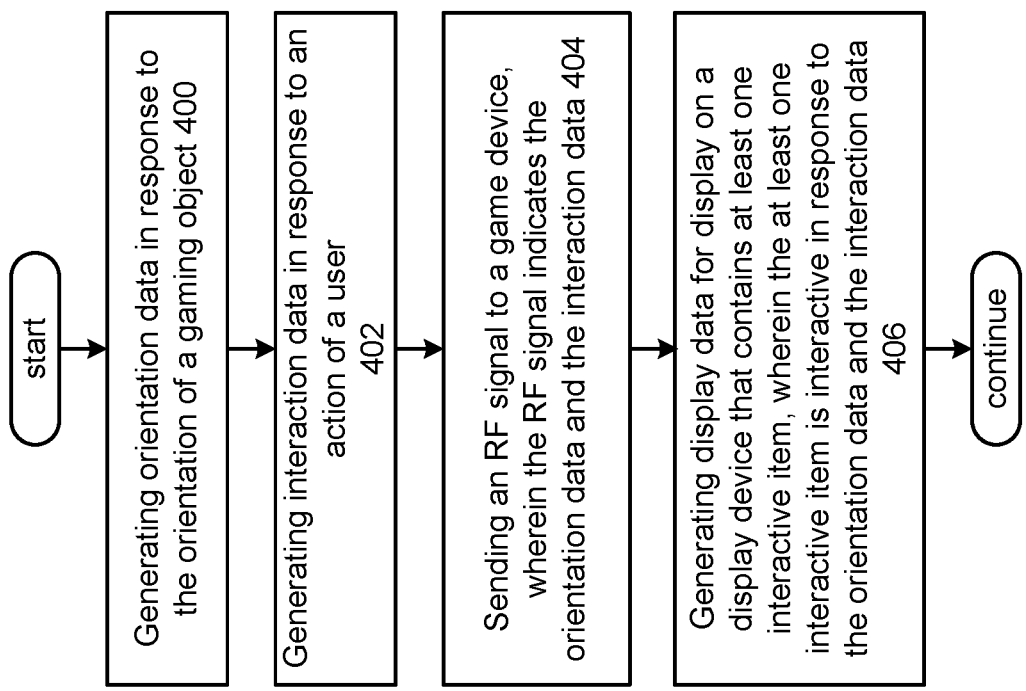
FIG. 22 is a flowchart representation of a method in accordance with an embodiment of the present invention.

FIG. 22 is a flowchart representation of a method in accordance with an embodiment of the present invention. In particular a method is presented for use in conjunction with one or more functions and features presented in conjunction with FIGS. 1-21. In step 400, orientation data is generated in response to the orientation of a gaming object. In step 402, interaction data is generated in response to an action of a user. In step 404, an RF signal is sent to a game device, wherein the RF signal indicates the orientation data and the interaction data. In step 406, display data is generated for display on a display device that contains at least one interactive item, wherein the at least one interactive item is interactive in response to the orientation data and the interaction data.

Figure 23:
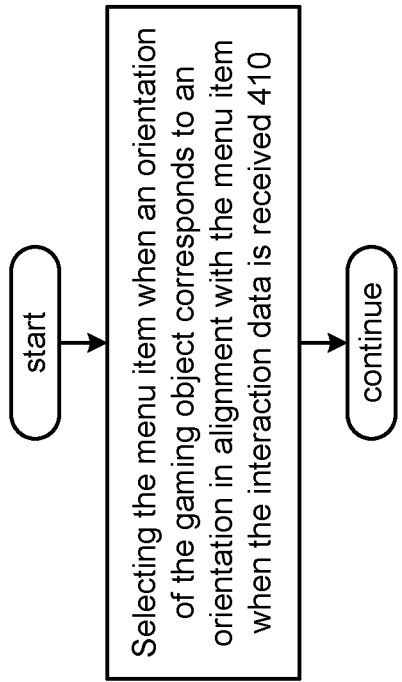
FIG. 23 is a flowchart representation of a method in accordance with an embodiment of the present invention.

FIG. 23 is a flowchart representation of a method in accordance with an embodiment of the present invention. In particular a method is presented for use in conjunction with one or more functions and features presented in conjunction with FIGS. 1-22, wherein the interactive item includes a menu item that is selectable In step 410, the menu item is selected when an orientation of the gaming object corresponds to an orientation in alignment with the menu item when the interaction data is received.

Figure 24:
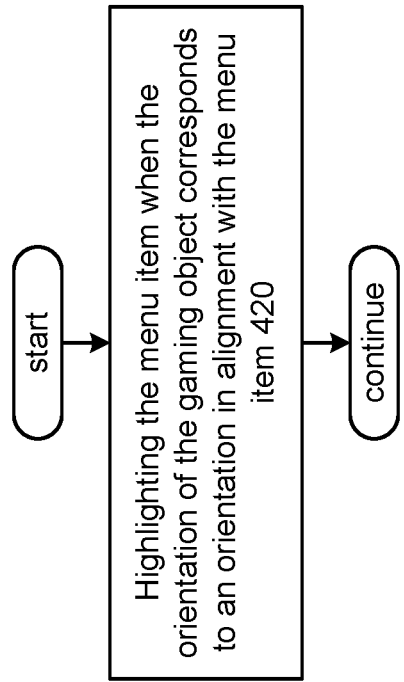
FIG. 24 is a flowchart representation of a method in accordance with an embodiment of the present invention.

FIG. 24 is a flowchart representation of a method in accordance with an embodiment of the present invention. In particular a method is presented for use in conjunction with one or more functions and features presented in conjunction with FIGS. 1-23. In step 420, a menu item is highlighted when the orientation of the gaming object corresponds to an orientation in alignment with the menu item.

Figure 25:
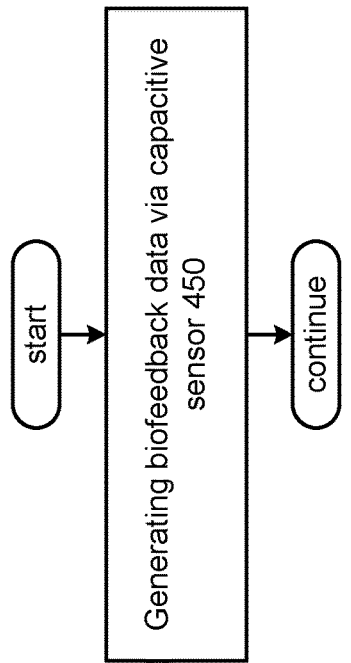
FIG. 25 is a flowchart representation of a method in accordance with an embodiment of the present invention.

FIG. 25 is a flowchart representation of a method in accordance with an embodiment of the present invention. In particular a method is presented for use in conjunction with one or more functions and features presented in conjunction with FIGS. 1-24 wherein the at least one interactive an interaction is generated when an orientation of the gaming object corresponds to an orientation in alignment with the graphics item.

Figure 26:
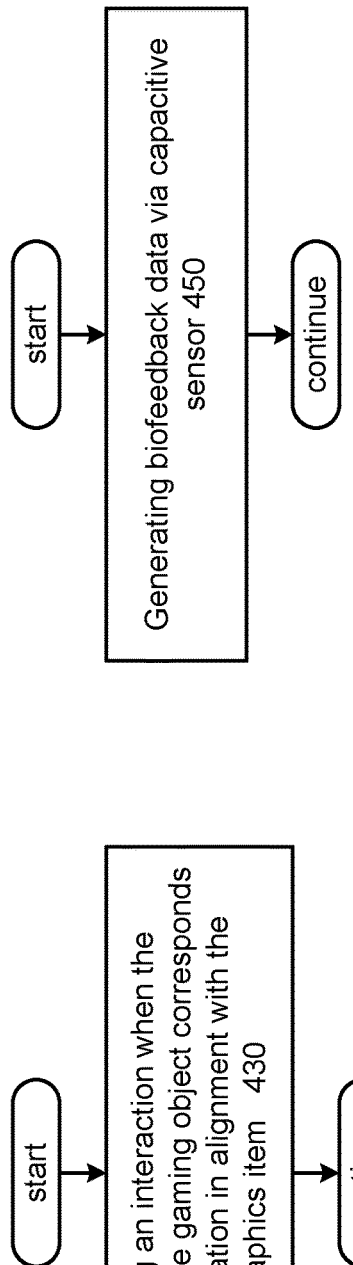
FIG. 26 is a flowchart representation of a method in accordance with an embodiment of the present invention.

FIG. 26 is a flowchart representation of a method in accordance with an embodiment of the present invention. In particular a method is presented for use in conjunction with one or more functions and features presented in conjunction with FIGS. 1-25. In step 440, user data is generated via a capacitive sensor that includes at least one of: an audio output command, an audio input command, a set-up command, gaming data, preferences data, product registration data, and authentication data. Further, the user data can indicate a manner in which a user grasps a gaming object.

Figure 27:
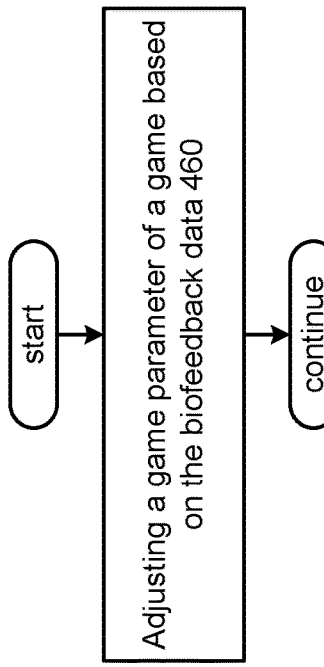
FIG. 27 is a flowchart representation of a method in accordance with an embodiment of the present invention.

FIG. 27 is a flowchart representation of a method in accordance with an embodiment of the present invention. In particular a method is presented for use in conjunction with one or more functions and features presented in conjunction with FIGS. 1-26. In step 450, generating biofeedback data via a capacitive sensor.

Figure 28:
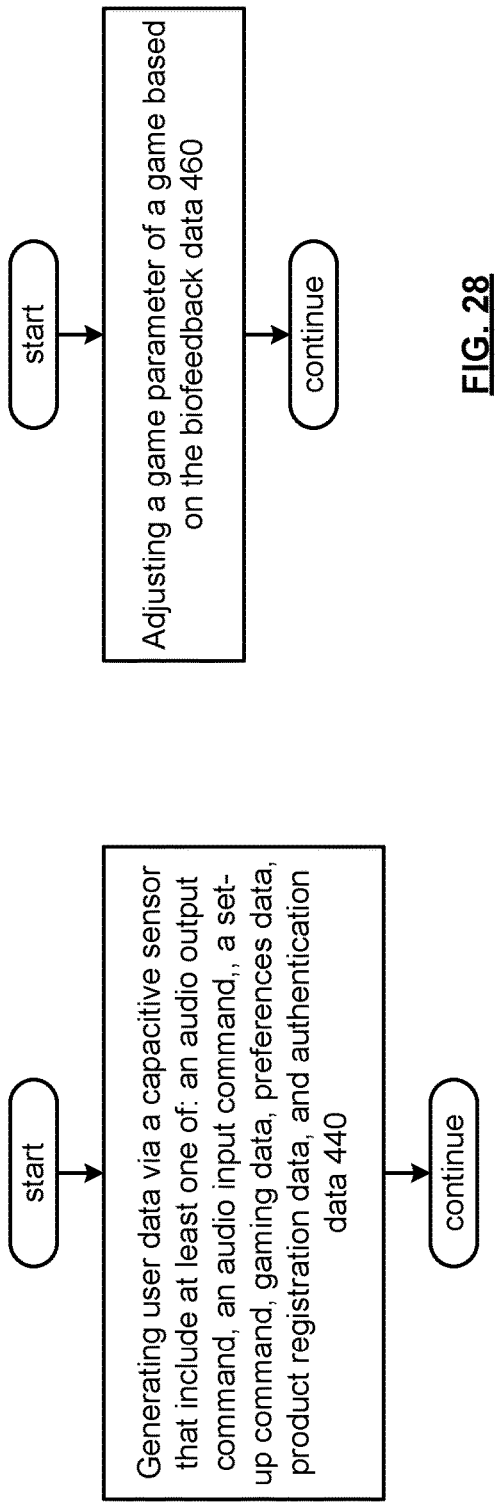
FIG. 28 is a flowchart representation of a method in accordance with an embodiment of the present invention.

FIG. 28 is a flowchart representation of a method in accordance with an embodiment of the present invention. In particular a method is presented for use in conjunction with one or more functions and features presented in conjunction with FIGS. 1-27. In step 460, a game parameter of a game is adjusted based on the biofeedback data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A gaming object comprising:
   a capacitive sensor including a capacitive layer having a charge that generates interaction data in response to actions of a user including touch of the user in proximity to the capacitive layer, the interaction data indicating an amount of the capacitive sensor that is covered by the touch of the user and a position of the touch; and
   a sensing tag comprising a power generating circuit, the sensing tag configured to:
      receive a first radio-frequency (RF) signal and generate, using the power generating circuit, a supply voltage for the sensing tag based on the first RF signal; and
      send a second RF signal, based on backscattering the first RF signal, to a game device, wherein the second RF signal comprises the interaction data.

2. The gaming object of claim 1, wherein the first RF signal is associated with a predetermined frequency.

3. The gaming object of claim 1, wherein the first RF signal is received periodically.

4. The gaming object of claim 1, further comprising a plurality of sensing tags, and wherein the gaming object is configured to compile data of the plurality of sensing tags and send the compiled data to the game device.

5. The gaming object of claim 1, wherein the supply voltage generated by the power generating circuit supplies power for functionality of the gaming object.

6. The gaming object of claim 1, further comprising a capacitor, and wherein the power generating circuit stores energy in the capacitor.

7. A method, comprising:
- receiving, by a sensing tag of a gaming object comprising a power generating circuit, a first radio-frequency (RF) signal and generating, using the power generating circuit, a supply voltage for the sensing tag based on the first RF signal;
- generating, by a capacitive sensor of the gaming object including a capacitive layer having a charge, interaction data in response to actions of a user including touch of the user in proximity to the capacitive layer, the interaction data indicating an amount of the capacitive sensor that is covered by the touch of the user and a position of the touch; and
- sending, by the sensing tag, a second RF signal, based on backscattering the first RF signal, to a game device, wherein the second RF signal comprises the interaction data.

8. The method of claim 7, wherein the first RF signal is associated with a predetermined frequency.

9. The method of claim 7, wherein the first RF signal is received periodically.

10. The method of claim 7, further comprising compiling, by the gaming object, data of a plurality of sensing tags and sending the compiled data to the game device.

11. The method of claim 7, wherein the supply voltage generated by the power generating circuit supplies power for functionality of the gaming object.

12. The method of claim 7, further comprising storing, by the power generating circuit, energy in a capacitor of the gaming object.

* * * * *